(12) United States Patent
Hamasaki et al.

(10) Patent No.: US 7,057,034 B2
(45) Date of Patent: Jun. 6, 2006

(54) TITANYL PHTHALOCYANINE CRYSTAL AND PRODUCTION METHOD OF THE SAME, AND ELECTROPHOTOSENSITIVE MATERIAL

(75) Inventors: Kazunari Hamasaki, Osaka (JP); Daisuke Kuboshima, Osaka (JP); Hisakazu Honma, Osaka (JP); Jun Azuma, Osaka (JP); Eiichi Miyamoto, Osaka (JP)

(73) Assignee: Kyocera Mita Corporation, Osaka (JP)

( * ) Notice: Subject to any disclaimer, the term of this patent is extended or adjusted under 35 U.S.C. 154(b) by 81 days.

(21) Appl. No.: 10/648,719

(22) Filed: Aug. 27, 2003

(65) Prior Publication Data

US 2004/0049027 A1    Mar. 11, 2004

(51) Int. Cl.
*C07D 487/22* (2006.01)
(52) U.S. Cl. .................. 540/141; 540/136; 540/137; 540/140
(58) Field of Classification Search ................ 540/141, 540/136, 137, 140
See application file for complete search history.

(56) References Cited

U.S. PATENT DOCUMENTS 6,528,645 B1 * 3/2003 Hamasaki et al. .......... 540/141

FOREIGN PATENT DOCUMENTS

| JP | 09-316354 | 12/1997 |
| JP | 2001-181531 | 7/2001 |

* cited by examiner

*Primary Examiner*—James O. Wilson
*Assistant Examiner*—Matthew L. Fedowitz
(74) *Attorney, Agent, or Firm*—Smith, Gambrell & Russell, LLP

(57) ABSTRACT

The present invention relates to a novel titanyl phthalocyanine crystal which can prepare a coating solution having excellent storage stability because it satisfies both of the following two characteristics (a) and (b), a method of producing the same, an electrophotosensitive material using the above crystal as an electric charge generating material.
(a) The crystal has a maximum peak at a Bragg angle $2\theta \pm 0.2° = 27.2°$ and has no peak at 7.4° in a CuKα characteristic X-ray diffraction spectrum.
(b) The crystal does not have a peak of a change in temperature within a range from 50 to 400° C. except for a peak associated with evaporation of adsorbed water in differential scanning calorimetry.

13 Claims, 12 Drawing Sheets

TITANYL PHTHALOCYANINE CRYSTAL AND PRODUCTION METHOD OF THE SAME, AND ELECTROPHOTOSENSITIVE MATERIAL

BACKGROUND OF THE INVENTION

The present invention relates to a novel titanyl phthalocyanine crystal formed from a titanyl phthalocyanine compound. The present invention also relates to a method of producing the titanyl phthalocyanine crystal. The present invention also relates to an electrophotosensitive material using the titanyl phthalocyanine crystal as an electric charge generating material.

Electrophotosensitive materials are used in image forming apparatuses such as electrostatic copying machine, laser printer and plain paper facsimile.

As the electrophotosensitive material, a so-called organic photosensitive material formed by using the following components in combination has widely been used.

Electric charge generating material which are irradiated with light to generate electric charges (holes and electrons)

Electric charge transferring material for transferring the generated electric charges, which is classified into a hole transferring material for transferring holes and an electron transferring material for transferring electrons.

Binding resin having a film forming property.

The organic photosensitive material has such an advantage that it is easily produced as compared with an inorganic photosensitive material using an inorganic semiconductor material.

The organic photosensitive material also has advantages such as wide range of choice of materials such as electric charge generating material, electric charge transferring material and binding resin, and high functional design freedom.

The organic photosensitive material is produced by forming a single-layer or multi-layer type photosensitive material on a conductive substrate.

The single-layer type photosensitive layer contains an electric charge generating material, an electric charge transferring material (hole transferring material and/or electron transferring material) and a binding resin in the same layer.

The multi-layer type photosensitive layer is formed by mutually laminating at least two layers among an electric charge generating layer containing an electric charge generating material, an electric charge transferring layer containing an electric charge transferring material (hole transferring material and/or electron transferring material), and a photoconductive layer containing an electric charge generating material and at least one of a hole transferring material and an electron transferring material.

As the electric charge generating material, for example, various pigments can be used according to the sensitivity range of the photosensitive material.

As the electric charge generating material for photosensitive material which is sensitive to infrared or near infrared light emitted from a semiconductor laser or infrared LED, for example, phthalocyanine pigments have widely been used.

The phthalocyanine pigment varies depending on the chemical structure and includes, for example, metal-free phthalocyanine compound, copper phthalocyanine and titanyl phthalocyanine. The respective compounds can be in various crystal forms.

Therefore, crystals having various crystal forms of various phthalocyanine compounds have been studied by a lot of investigators to find out optimum crystals suited best for use as the electric charge generating material.

For example, Japanese Patent Publication No. 2907121 discloses that a crystal having a Y type crystal form of titanyl phthalocyanine is superior in sensitivity characteristics for electric charge generating material to a crystal having the other crystal form and can contribute to an improvement in sensitivity of the electrophotosensitive material.

A coating solution for the single-layer type photosensitive layer, or a coating solution for electric charge generating layer of the multi-layer type photosensitive layer using the Y type titanyl phthalocyanine crystal can be prepared by adding the crystal and other components in an organic solvent and uniformly dispersing them.

The layer formed by coating the coating solution on the substrate immediately after preparation or within about 60 minutes, and drying the coating solution is particularly superior in sensitivity characteristics as described in the above publication.

However, the sensitivity characteristics of the layer, which was formed by coating the coating solution after storage for a fixed time (e.g. 24 hours) and drying the coating solution, is drastically lowered as compared with the layer formed by using the coating solution immediately after preparation.

It has been found that, since the coating solution prepared by using the Y type titanyl phthalocyanine crystal described in the above publication is inferior in storage stability, the photosensitive layer having good sensitivity characteristics can not be formed stably.

Japanese Laid Opened Patent Application No. 2001-181531 (2001) proposed a titanyl phthalocyanine crystal which gives a coating solution capable of forming an electrophotosensitive material having good sensitivity characteristics even when stored for 24 hours after the preparation of the coating solution, and an electrophotosensitive material using the same.

However, the present inventors have studied and found that the storage stability of the coating solution is insufficient in stable storage only for 24 hours and it is necessary to further improve the storage stability.

As a coating apparatus for producing an electrophotosensitive material by applying a coating solution on a substrate, there is generally used a circulating type coating apparatus wherein the coating solution, which was not deposited on the substrate, is recovered and circulated to be reused. The coating solution is sometimes circulated in such a circulating type coating apparatus for a long time of 24 hours or more.

In the production of the electrophotosensitive material, a wide variety of electrophotosensitive materials are produced by using the same coating apparatus. During the production of the other kind of electrophotosensitive material, the coating solution must be stored for several days.

Therefore, the storage stability of the coating solution is insufficient in stable storage only for 24 hours and it is necessary to further improve the storage stability.

SUMMARY OF THE INVENTION

A main object of the present invention is to provide a novel titanyl phthalocyanine crystal capable of preparing a coating solution having excellent storage stability, which can stably form a photosensitive layer having good sensitivity characteristics.

Another object of the present invention is to provide a method of producing the titanyl phthalocyanine crystal.

Still another object of the present invention is to provide an electrophotosensitive material having excellent sensitivity characteristics using the titanyl phthalocyanine crystal.

To attain the objects described above, the present inventors has studied about the cause of deterioration of the storage stability using a conventional Y type titanyl phthalocyanine crystal described above. As a result, they have found the following fact.

A conventional Y type titanyl phthalocyanine crystal has poor stability in an organic solvent contained in the coating solution, for example, tetrahydrofuran. Therefore, a crystal transfer is liable to occur, that is, the Y type crystal form is gradually changed into the β type crystal with poor sensitivity characteristics during the storage of the coating solution in a fixed period. Therefore, the longer the lapsed time after preparation, the inferior the sensitivity characteristics of the layer formed by using such a coating solution tend to become.

Therefore, the present inventors have studied about the physical properties to improve the stability of the titanyl phthalocyanine in the organic solvent.

As a result, they have found that the titanyl phthalocyanine crystal satisfying both of the following two physical properties (a) and (b) is superior in stability in the organic solvent to a conventional Y type titanyl phthalocyanine crystal and hardly causes crystal form changing, as is apparent from the results of the Examples and Comparative Examples described below, so that a coating solution having excellent storage stability can be formed. Thus, the present invention has been completed.

(a) The crystal has a maximum peak at a Bragg angle $2\theta \pm 0.2° = 27.2°$ and has no peak at $7.4°$ in a CuKα characteristic X-ray diffraction spectrum.
(b) The crystal does not have a peak of a change in temperature within a range from 50 to 400° C. except for a peak associated with evaporation of adsorbed water in differential scanning calorimetry.

The titanyl phthalocyanine crystal of the present invention can be produced by the production method of the present invention, which comprises the following steps:

a pigmentation pretreatment step of adding a titanyl phthalocyanine compound in an aqueous organic solvent, stirring under heating for a fixed time, and allowing the resulting solution to stand for a fixed time under the conditions at a temperature lower than that of the above stirring process, thereby to stabilize the solution;

a recrystallization step of removing the aqueous organic solvent from the solution to obtain a crude crystal of the titanyl phthalocyanine, dissolving the crude crystal of the titanyl phthalocyanine in a solvent, adding dropwise the solution in a poor solvent to recrystallize the titanyl phthalocyanine compound, and then subjecting the recrystallized compound; and a pigmentation step of dispersing the low crystalline titanyl phthalocyanine compound obtained by recrystallization in an organic solvent in the presence of water, and stirring the solution at 30 to 100° C. for 5 to 60 hours.

The titanyl phthalocyanine crystal of the present invention can also be produced by other production method of the present invention, which comprises the following steps:

a pigmentation pretreatment step of adding a titanyl phthalocyanine compound in an aqueous organic solvent, stirring under heating for a fixed time, and allowing the resulting solution to stand for a fixed time under the conditions at a temperature lower than that of the above stirring process, thereby to stabilize the solution;

a step of removing the aqueous organic solvent from the solution to obtain a crude crystal of the titanyl phthalocyanine, and treating the crude crystal of the titanyl phthalocyanine according to acid-paste method; and a pigmentation step of dispersing the treated low crystalline titanyl phthalocyanine compound in an organic solvent in the presence of water, and stirring the solution at 30 to 100° C. for 5 to 60 hours.

The electrophotosensitive material of the present invention comprises a photosensitive layer containing the titanyl phthalocyanine crystal of the present invention as the electric charge generating material.

Examples of the photosensitive layer include:
(A) a single-layer type photo sensitive layer containing the titanyl phthalocyanine crystal, at least one of a hole transferring material and an electron transferring material, and a binding resin in the same layer, and
(B) a multi-layer type photosensitive layer comprising at least two layers among an electric charge generating layer containing the titanyl phthalocyanine crystal, an electric charge transferring layer containing at least one of a hole transferring material and an electron transferring material, and a photoconductive layer containing the titanyl phthalocyanine crystal and at least one of a hole transferring material and an electron transferring material, which are mutually laminated. The electrophotosensitive material of the present invention can attain good sensitivity characteristics, that are always stable regardless of the lapsed time after preparing the coating solution. The titanyl phthalocyanine crystal of the present invention can retain a crystal form stably in the photosensitive layer even after preparing the photosensitive material. Therefore, the photosensitive material can retain good sensitivity characteristics, that are stable with a lapse of time, without lowering the sensitivity characteristics on use.

DETAILED DESCRIPTION OF THE INVENTION

Figure 1:
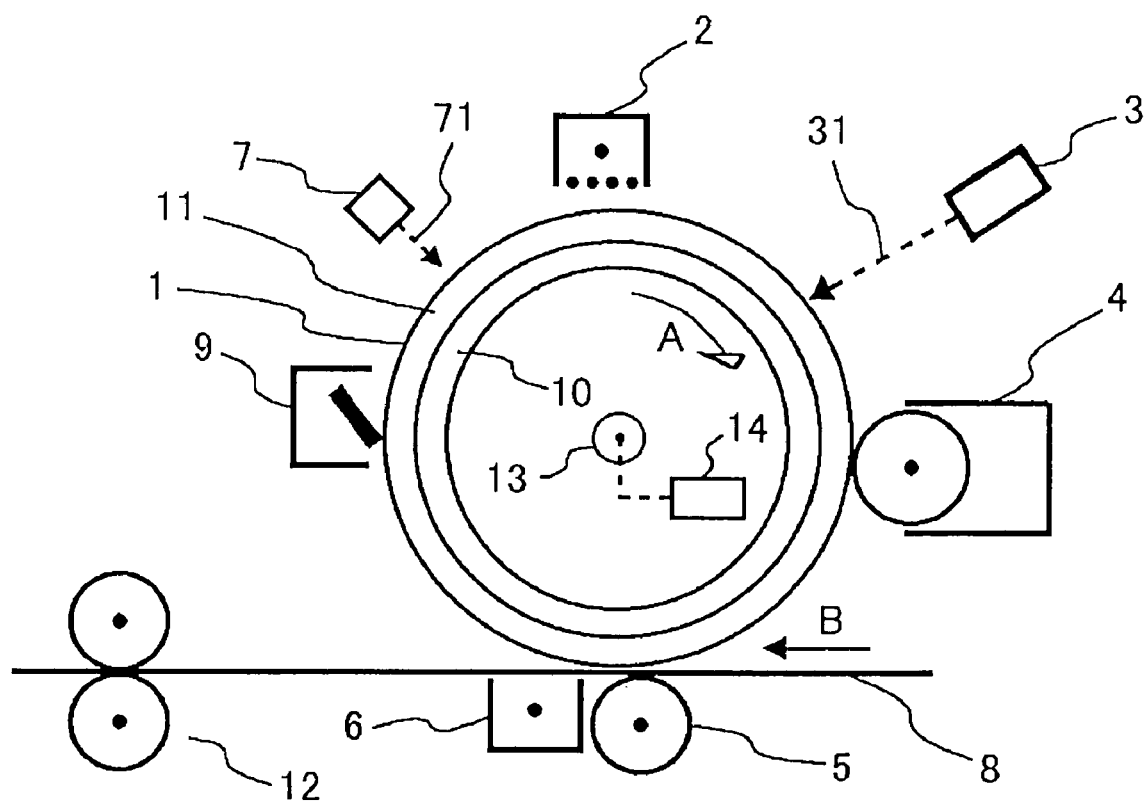
FIG. 1 is a diagram showing schematically an embodiment of an image forming apparatus.

The present invention will be described below.

<Titanyl Phthalocyanine Crystal and Method of Producing the Same>

As described above, the titanyl phthalocyanine crystal of the present invention satisfying both of the following two physical properties (a) and (b).
(a) The crystal has a maximum peak at a Bragg angle $2\theta \pm 0.2°=27.2°$ and has no peak at 7.4° in a CuKα characteristic X-ray diffraction spectrum measured by using, as a radiation source, CuKα having a wave length of 1.541 Å that is a characteristic X-ray of copper.
(b) The crystal does not have a peak of a change in temperature within a range from 50 to 400° C. except for a peak associated with evaporation of adsorbed water in differential scanning calorimetry.

Taking account of the fact that the titanyl phthalocyanine crystal forms a coating solution having excellent storage stability, the crystal preferably has no peak at a Bragg angle $2\theta \pm 0.2°=26.2°$ in a CuKα characteristic X-ray diffraction spectrum.

The titanyl phthalocyanine crystal is a crystal of a titanyl phthalocyanine compound represented by the formula (1):

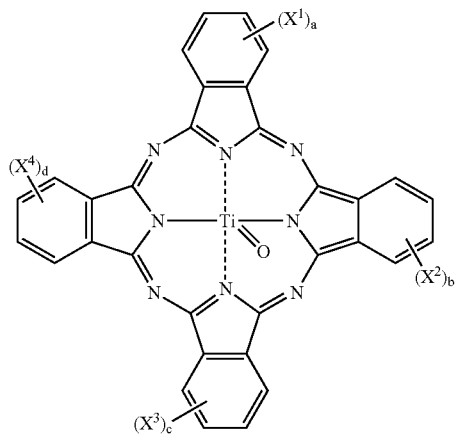

(1)

wherein $X^1$, $X^2$, $X^3$ and $X^4$ are the same or different and each represents a halogen atom, an alkyl group, an alkoxy group, a cyano group, or a nitro group, and a, b, c and d are the same or different and each represents an integer of 0 to 4, and also satisfies both of the above physical properties (a) and (B).

It is preferable that the titanyl phthalocyanine crystal causes no change in the above respective characteristics even when recovered after dipping in an organic solvent for 7 days so as to form a coating solution having excellent storage stability.

It is preferable that the recovered crystal has a maximum peak at a Bragg angle $2\theta \pm 0.2°=27.2°$ and has no peak at 7.4° in a CuKα characteristic X-ray diffraction spectrum.

It is preferable that the recovered crystal recovered does not have a peak of a change in temperature within a range from 50 to 400° C. except for a peak associated with evaporation of adsorbed water in differential scanning calorimetry.

It is further preferable that the recovered crystal also has no peak at a Bragg angle $2\theta \pm 0.2°=26.2°$ in a CuKα characteristic X-ray diffraction spectrum.

The organic solvent in which the crystal is dipped includes tetrahydrofuran, dichloromethane, toluene, 1,4-dioxane and a mixture thereof.

The dipping in the organic solvent as the standard for evaluation of the stability of the crystal may be conducted under the same conditions as those in case of actually storing the coating solution. For example, the coating solution is preferably allowed to stand in a closed system under the conditions of a temperature of $23 \pm 1°$ C. and a relative humidity of 50 to 60%.

The halogen atom corresponding to $X^1$ to $X^4$ in the general formula (1) includes, for example, fluorine, chlorine, bromine and iodine. The alkyl group includes, for example, alkyl groups having 1 to 6 carbon atoms, such as methyl, ethyl, n-propyl, isopropyl, n-butyl, isobutyl, sec-butyl, tert-butyl, pentyl and hexyl. The alkoxy group includes, for example, alkoxy groups having 1 to 6 carbon atoms, such as methoxy, ethoxy, n-propoxy, isopropoxy, n-butoxy, isobutoxy, sec-butoxy, tert-butoxy, pentyloxy and hexyloxy.

Preferable examples of the titanyl phthalocyanine compound include compounds represented by the formula (11):

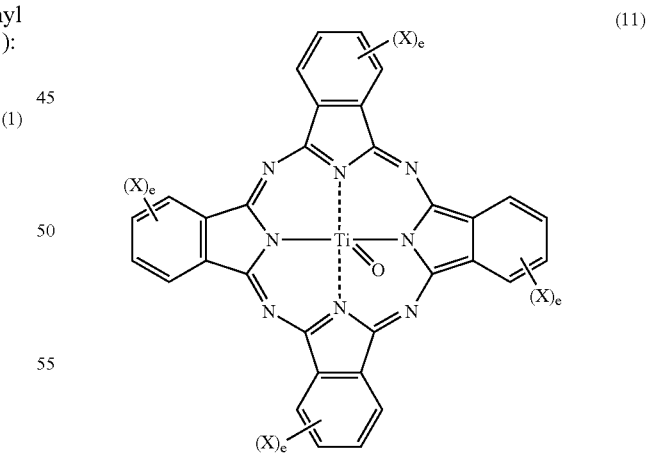

(11)

wherein X represents a halogen atom, an alkyl group, an alkoxy group, a cyano group, or a nitro group; and e represents an integer of 0 to 4; provided that $X^1$ to $X^4$ in the general formula (1) represent the same X, and a to d, each showing the substitution number, represent the same number e. Among these compounds, a non-substituted titanyl phthalocyanine represented by the formula (11-1)

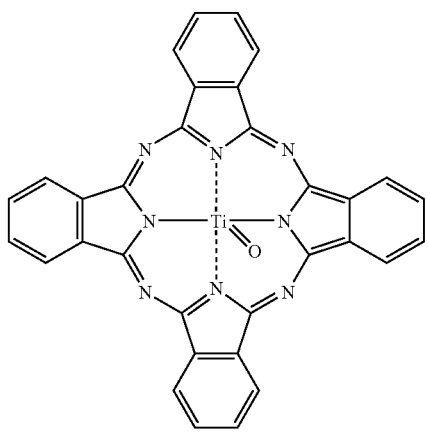

(11-1)

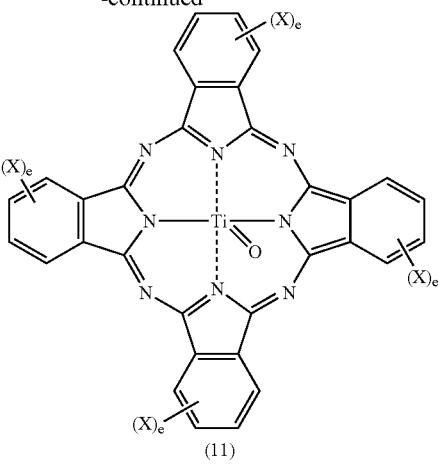

(11)

is used most preferably.

To produce a titanyl phthalocyanine crystal which is represented by the general formula (11) and satisfies both of the above physical properties (a) and (b), phthalonitrile or a derivative (11a) thereof is first reacted with a titanium alkoxide (11b) as shown in the following reaction scheme:

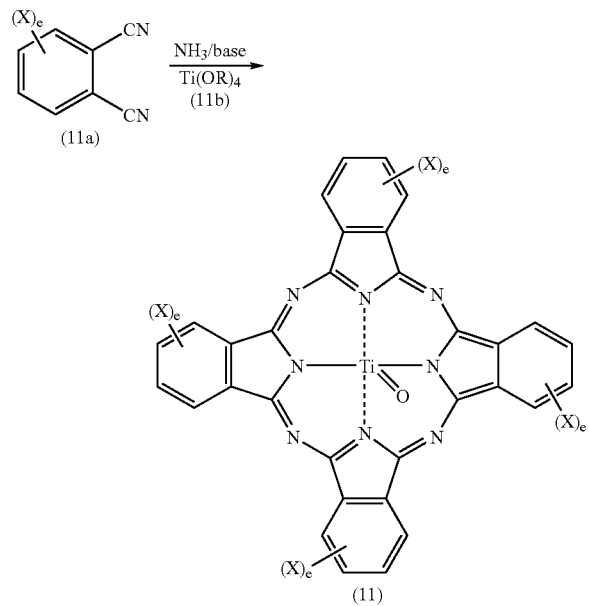

wherein X and e are as defined above, and R represents the same alkyl group having 1 to 6 carbon atoms and n-butyl is particularly preferred, or 1,3-diiminoindoline or a derivative (11c) thereof is reacted with a titanium alkoxide (11b) as shown in the following reaction scheme:

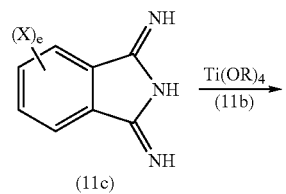

wherein X and e are as defined above, and R represents the same alkyl group having 1 to 6 carbon atoms and n-butyl is particularly preferred, thereby to synthesize a titanyl phthalocyanine compound (11).

Then, the titanyl phthalocyanine compound (11) is subjected to a pigmentation pretreatment, which comprises the steps of adding the titanyl phthalocyanine compound in an aqueous organic solvent, stirring under heating for a fixed time, and allowing the resulting solution to stand for a fixed time under the conditions at a temperature lower than that of the above stirring process, thereby to stabilize the solution.

The water-soluble organic solvent used in the pigmentation pretreatment includes, for example, alcohols such as methanol, ethanol and isopropanol; N,N-dimethylformamide, N,N-dimethylacetamide, propionic acid, acetic acid, N-methylpyrrolidone and ethylene glycol; or a mixture thereof. A small amount of a water-insoluble organic solvent may also be added in the water-soluble organic solvent.

The conditions of the stirring treatment among the pigmentation pretreatment are not specifically limited, but the stirring treatment is preferably conducted under the temperature-constant conditions of a temperature within a range from about 70 to 200° C. for about 1 to 3 hours.

The conditions of the stabilization treatment after the stirring treatment are not also specifically limited, but the solution is preferably stabilized by allowing to stand under the temperature-constant conditions of a range within a range from about 10 to 50° C., preferably at room temperature (23±1° C.), for about 5 to 10 hours.

After the completion of the pigmentation pretreatment, a crude crystal of the titanyl phthalocyanine compound obtained by removing the water-soluble organic solvent is recrystallized by dissolving the crude crystal in a solvent according to a conventional method, and adding dropwise the solution in a poor solvent.

Examples of the solvent which dissolves the crude crystal include halogenated-hydrocarbon such as dichloromethane, chloroholm, ethyl bromide and butyl bromide; trihaloacetic acid such as trifluoroacetic acid, trichloroacetic acid and tribromoacetic acid; and sulfuric acid. These solvents can be used alone or two or more kinds of them can be used in combination.

Examples of the poor solvent used for recrystallization include water and an aqueous organic solvent. The aqueous organic solvent includes alcohol such as methanol, ethanol and isopropanol; acetone and dioxane. These solvents can be used alone or two or more kinds of them can be used in combination.

The low crystalline titanyl phthalocyanine compound obtained by recrystallization is subjected to a pigmentation treatment comprising the steps of filtration, washing, dispersion in an organic solvent at 30 to 100° C. for 5 to 60 hours in the presence of water without drying the solid, and stirring, followed by the steps of filtration and drying, thus producing the titanyl phthalocyanine crystal of the present invention which satisfies both of the above physical properties (a) and (b).

The organic solvent used in the pigmentation pretreatment includes halogenated-hydrocarbons such as dichloromethane, chloroform, ethyl bromide and butyl bromide; trihaloacetic acids such as trifluoroacetic acid, trichloroacetic acid and tribromoacetic acid; and sulfuric acid. These solvents can be used alone or two or more kinds of them can be used in combination.

The titanyl phthalocyanine crystal of the present invention can be also produced by the following method.

Namely, after the completion of the pigmentation pretreatment, a crude crystal of the titanyl phthalocyanine compound obtained by removing an aqueous organic solvent is treated according to acid-paste method, which comprises the steps of dissolving the crude crystal in acid, and adding dropwise the solution in water under ice-cooling, followed by stirring the resulting solution for a fixed time and allowing to stand at room temperature (23±1° C.), thereby to recrystallize the solution.

Then, a low crystalline titanyl phthalocyanine compound obtained by subjecting to the above treatment is subjected to a pigmentationtreatment comprising the steps of filtration, washing, and dispersion in an organic solvent at 30 to 100° C. for 5 to 60 hours in the presence of water without drying.

The treated solid is collected by filtration and then dried to obtain the titanyl phthalocyanine crystal of the present invention which satisfies both of the above physical properties (a) and (b).

Examples of the acid used for acid-paste method include concentrated sulfuric acid. The organic solvent used in the pigmentation treatment is the same as described above.

<Electrophotosensitive Material and Method of Producing the Same>

The electrophotosensitive material of the present invention is characterized in that a photosensitive layer containing the above titanyl phthalocyanine crystal of the present invention as the electric charge generating material on a conductive substrate.

In the electrophotosensitive material of the present invention, when a titanyl phthalocyanine crystal isolated from the photosensitive layer is dipped in a closed system under the conditions of a temperature of 23±1° C. and a relative humidity of 50 to 60% for 7 days and the CuKα characteristic X-ray diffraction spectrum of the recovered titanyl phthalocyanine crystal is measured, it is preferable that the titanyl phthalocyanine crystal has a maximum peak at a Bragg angle 2θ±0.2°=27.2° and has no peak at 7.4°.

It is preferable that the recovered crystal does not have a peak of a change in temperature within a range from 50 to 400° C. except for a peak associated with evaporation of adsorbed water in differential scanning calorimetry.

It is further preferable that the recovered titanyl phthalocyanine crystal also has no peak at a Bragg angle 2θ±0.2°=26.2° in a CuKα characteristic X-ray diffraction spectrum.

In case the recovered titanyl phthalocyanine crystal does not satisfy any one of the above conditions, does not retain the crystal form stably after the production of the photosensitive material. Therefore, the photosensitive material using such a titanyl phthalocyanine can not retain good sensitivity characteristics that are stable with a lapse of time.

To isolate the titanyl phthalocyanine crystal from the photosensitive layer, the photosensitive layer peeled from the substrate may be dissolved in tetrahydrofuran, followed by decantation or filtration of the solution.

The photosensitive layer includes so-called single-layer type and multi-layer type photosensitive layers, but the present invention can be applied to both of them.

The single-layer type photosensitive layer is formed by coating a coating solution prepared by dissolving or dispersing a titanyl phthalocyanine crystal as the electric charge generating material in a suitable organic solvent, together with an electric charge transferring material and a binding resin, on a conductive substrate by a coating means, followed by drying. Such a single-layer type photosensitive layer has a simple layer construction and is superior in productivity.

As the electric charge transferring material, for example, the electron transferring materials and/or hole transferring materials can be used. Particularly, the single-layer type photosensitive layer using both transferring materials in combination has an advantage that it can be applied to any of positive and negative charging with a single construction.

Preferable electron transferring material includes, for example, those capable of extracting electrons generated in the titanyl phthalocyanine crystal from the crystal and transferring them efficiently because of good matching with the titanyl phthalocyanine crystal. Similarly, preferable hole transferring material includes, for example, those capable of extracting holes generated in the titanyl phthalocyanine crystal from the crystal and transferring them efficiently because of good matching with the titanyl phthalocyanine crystal.

In the system where the electron transferring material and hole transferring material coexist, it is necessary to consider the combination of both transferring materials to prevent lowering of the electric charge transferability of the whole photosensitive layer, resulting in lowering of the sensitivity of the photosensitive material. Therefore, it is preferred to select the combination of both transferring materials, even if both materials are contained in the same layer in high concentration where hole transfer and electron transfer occur efficiently, a charge transfer complex is not formed.

The multi-layer type photosensitive layer is formed by mutually laminating at least two layers among an electric charge generating layer containing an electric charge generating material, an electric charge transferring layer containing an electric charge transferring material (hole transferring material and/or electron transferring material), and a photoconductive layer containing an electric charge generating material and at least one of a hole transferring material and an electron transferring material.

Among them, the multi-layer type photosensitive layer comprising an electric charge generating layer and an electric charge transferring layer is formed by forming an electric charge generating layer containing a titanyl phthalocyanine crystal using a means such as vacuum deposition method or coating method, coating a coating solution containing an electric charge transferring material and a binding resin on the electric charge generating layer, and drying the coating solution to form an electric charge transferring layer.

To the contrary, the electric charge transferring layer may be formed on the conductive substrate, followed by formation of the electric charge generating layer thereon.

Since the electric charge generating layer has a very thin film thickness as compared with the electric charge transferring layer, it is preferred that the electric charge generating layer is formed on the conductive substrate and the electric charge transferring layer is formed thereon to protect the electric charge generating layer.

The charging type (positively or negatively charging) of the multi-layer type photosensitive layer is selected depending on the formation order of the electric charge generating layer and electric charge transferring layer and the kinds of the electric charge transferring material used in the electric charge transferring layer.

In the layer construction where the electric charge generating layer is formed on the conductive substrate and the electric charge transferring layer is formed thereon, when using the hole transferring material as the electric charge transferring material of the electric charge transferring layer, the photosensitive layer becomes a negatively charging type. In this case, the electron transferring material may be contained in the electric charge generating layer. Preferable electron transferring material to be contained in the electric charge generating layer includes, for example, those capable of extracting electrons generated in the titanyl phthalocyanine crystal from the crystal and transferring them efficiently because of good matching with the titanyl phthalocyanine crystal.

In the above layer construction, when using the electron transferring material as the electric charge transferring material of the electric charge transferring layer, the photosensitive layer becomes a positively charging type. In this case, the hole transferring material may be contained in the electric charge generating layer. Preferable hole transferring material to be contained in the electric charge generating layer includes, for example, those capable of extracting holes generated in the titanyl phthalocyanine crystal from the crystal and transferring them efficiently because of good matching with the titanyl phthalocyanine crystal.

As the electron transferring material, there can be used any of various electron transferring compounds which have conventionally been known.

Examples of the electron transferring material, that can be used preferably, include electron attractive compounds such as benzoquinone compound, diphenoquinone compound, naphthoquinone compound, malononitrile, thiopyran compound, tetracyanoethylene, 2,4,8-trinitrothioxanthone, fluorenone compound [e.g. 2,4,7-trinitro-9-fluorenone], dinitrobenzene, dinitroanthracene, dinitroacridine, nitroanthraquinone, succinic anhydride, maleic anhydride, dibromomaleic anhydride, 2,4,7-trinitrofluorenoneimine compound, ethylated nitrofluorenoneimine compound, tryptoanthrine compound, tryptoanthrineimine compound, azafluorenone compound, dinitropyridoquinazoline compound, thioxanthene compound, 2-phenyl-1,4-benzoquinone compound, 2-phenyl-1,4-naphthoquinone compound, 5,12-naphthacenequinone compound, α-cyanostilbene compound, 4'-nitrostilbene compound, and salt of anion radical of benzoquinone compound and cation. These electron transferring materials can be used alone, or two or more kinds of them can be used in combination.

Among the electron transferring materials, any of compounds represented by following formulas (ET-1) to (ET-15) is particularly preferably used as the electron transferring material having excellent electron transferability and good matching with the titanyl phthalocyanine crystal.

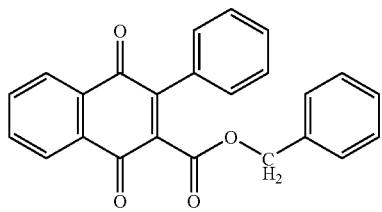

(ET-1)

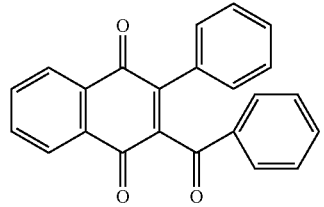

(ET-2)

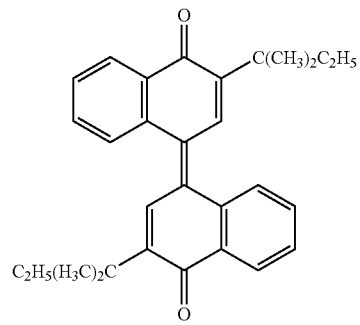

(ET-3)

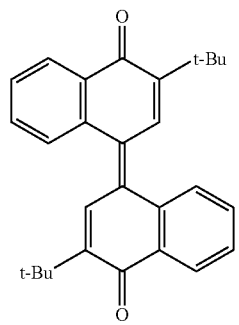

(ET-4)

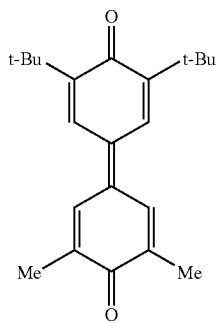

(ET-5)

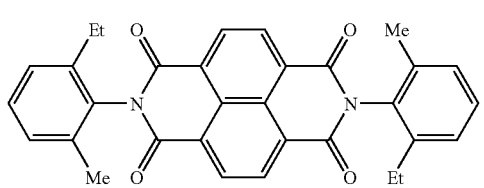

(ET-6)

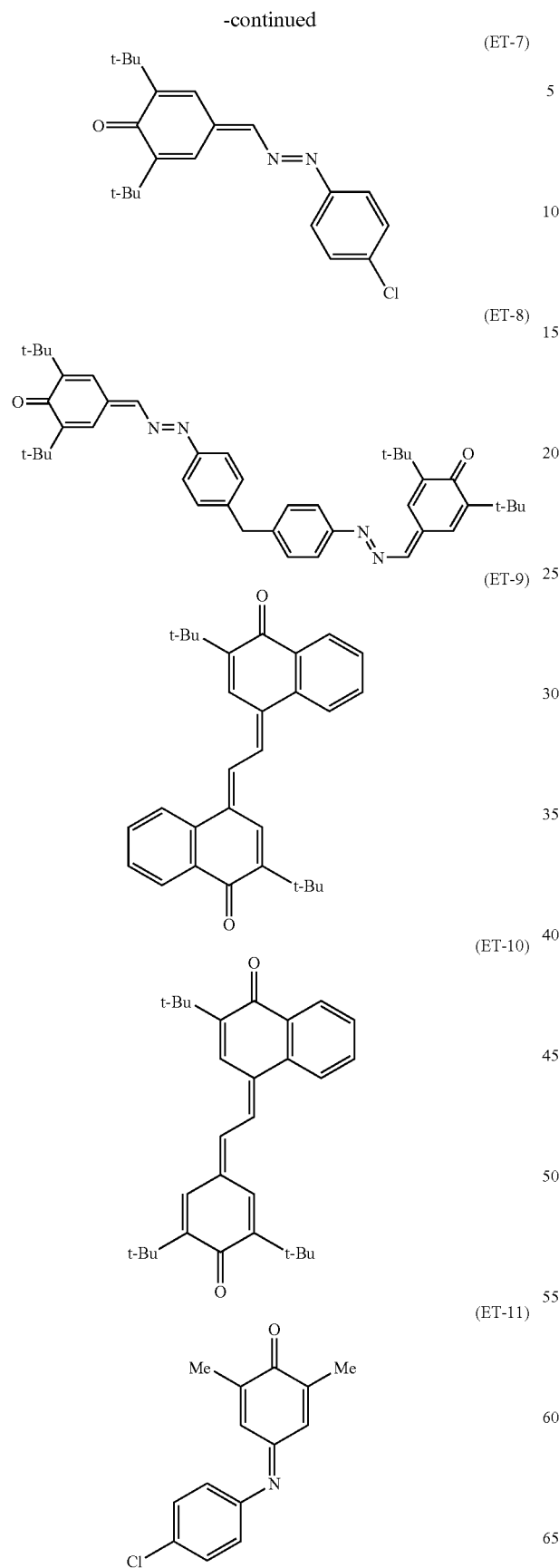
As the hole transferring material, there can be used any of various hole transferring compounds which have conventionally been known. Examples of the hole transferring material, that can be used preferably, include bendizine compound, phenylenediamine compound, naphthylenediamine compound, phenanthrylenediamine compound, oxadiazole compound [e.g. 2,5-di (4-methylaminophenyl)-1,3,4-oxadiazole], styryl compound [e.g. 9-(4-diethylaminostyryl)anthracene], carbazole compound [e.g. poly-N-vinylcarbazole], organopolysilane compound, pyrazoline compound [e.g. 1-phenyl-3-(p-dimethylaminophenyl)pyrazoline], hydrazone compound, triphenylamine compound, indole compound, oxazole compound, isoxazole compound, thiazole compound, thiadiazole compound, imidazole compound, pyrazole compound, triazole compound, butadiene compound, pyrene-hydrazone compound, acrolein compound, carbazole-hydrazone compound, quinoline-hydrazone compound, stilbene compound, stilbene-hydrazone compound and diphenylenediamine compound. These hole transferring materials can be used alone, or two or more kinds of them can be used in combination.

Among these hole transferring materials, any of compounds represented by the following formulas (HT-1) to (HT-19) is particularly preferably used as the hole transferring material having excellent hole transferability and good matching with the titanyl phthalocyanine crystal.

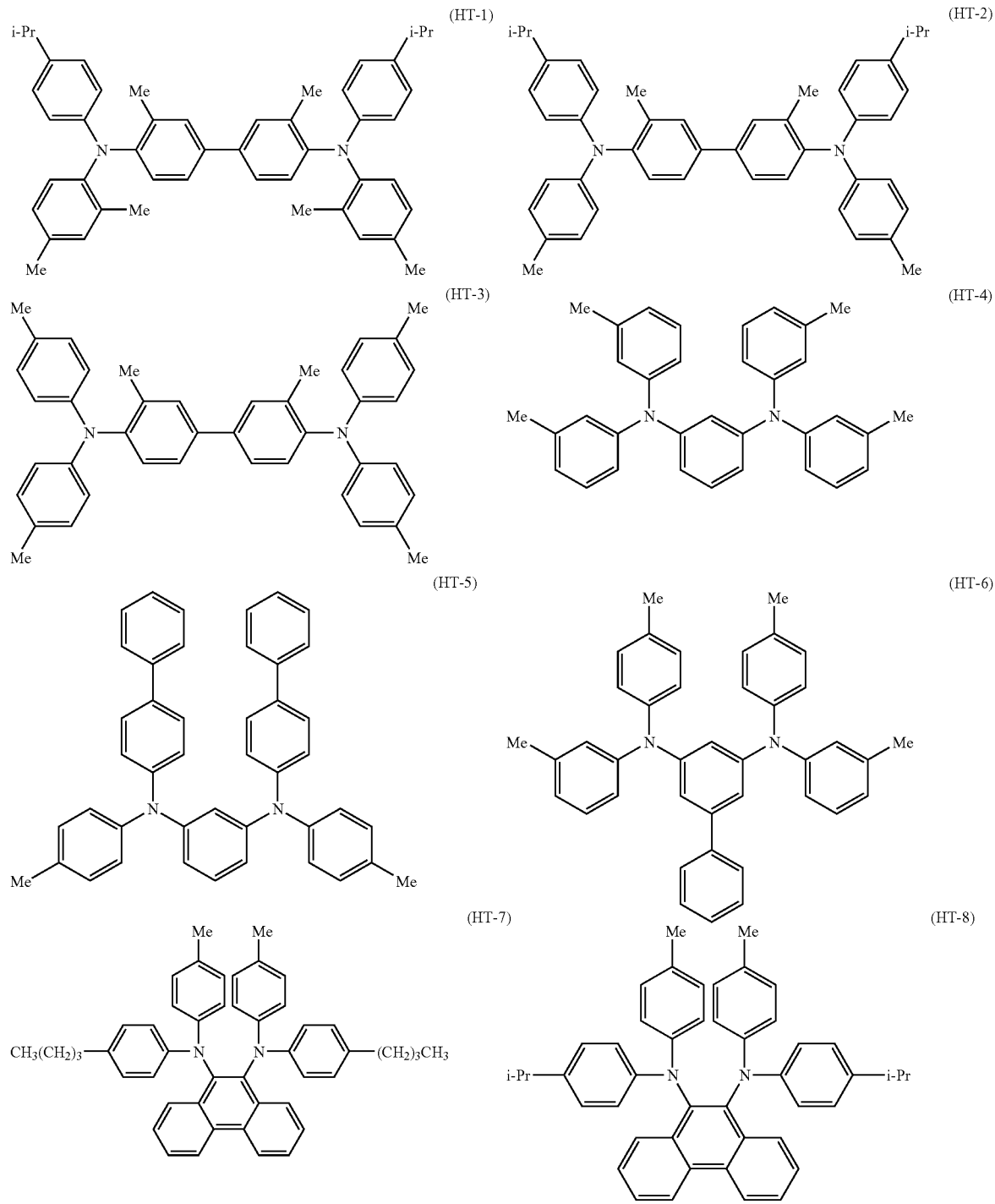

-continued
(HT-9)
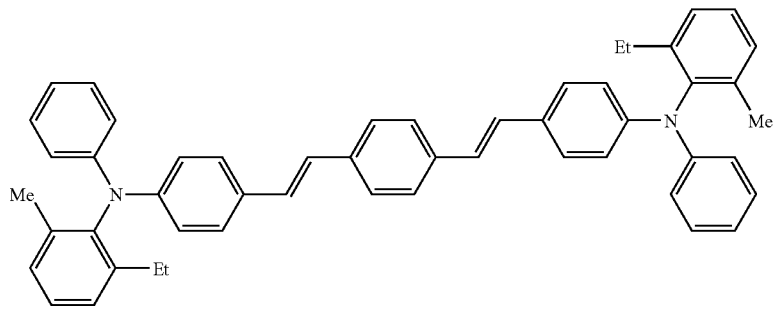
(HT-10)
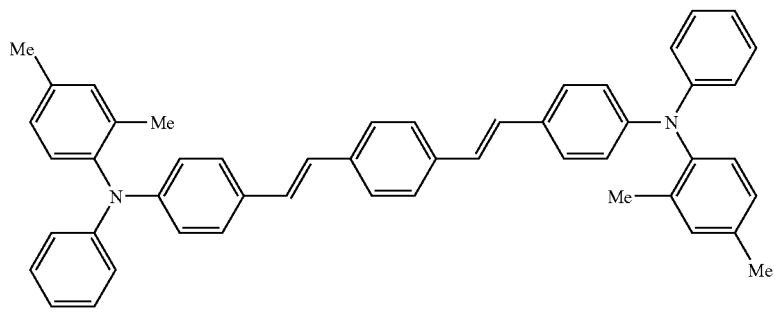
(HT-11)
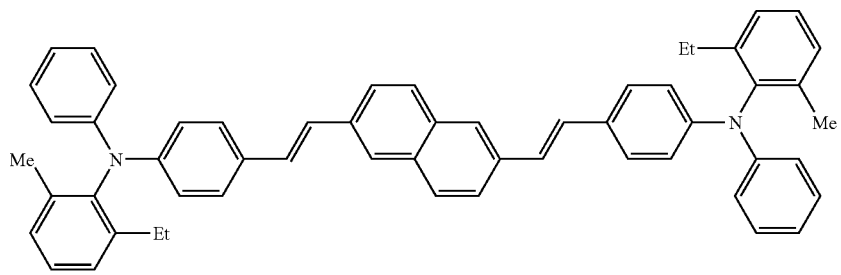
(HT-12)
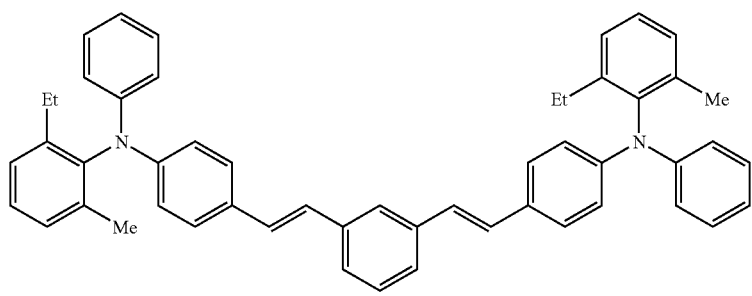
(HT-13)
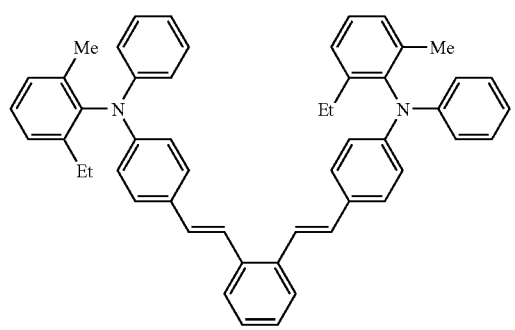
(HT-14)
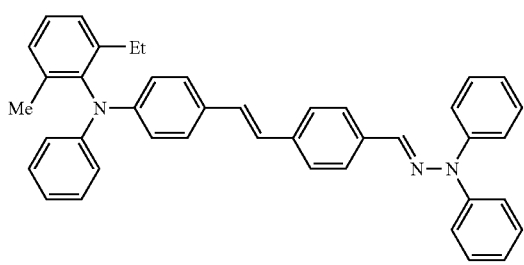

-continued

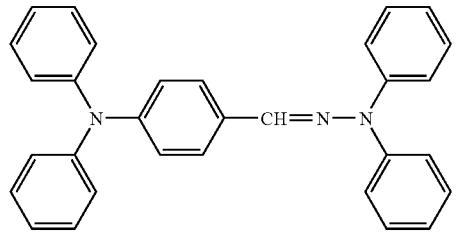
(HT-15)

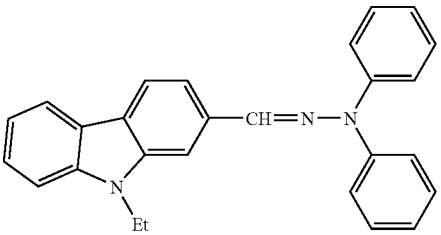
(HT-16)

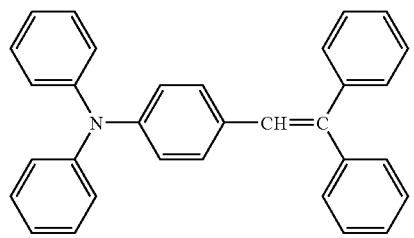
(HT-17)

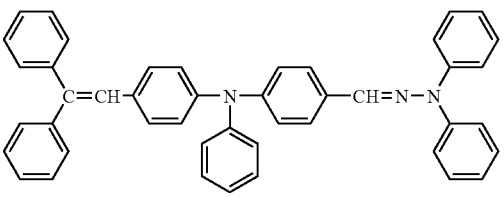
(HT-18)

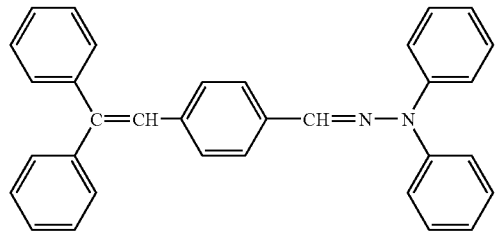
(HT-19)

The binding resin include, for example, thermoplastic resins such as styrene polymer, styrene-butadiene copolymer, styrene-acrylonitrile copolymer, styrene-maleic acid copolymer, acrylic resin, styrene-acrylic copolymer, polyethylene, ethylene-vinyl acetate copolymer, chlorinated polyethylene, polyvinyl chloride, polypropylene, vinyl chloride-vinyl acetate copolymer, polyester, alkyd resin, polyamide, polyurethane, polycarbonate, polyallylate, polusulfone, diallyl phthalate resin, ketone resin, polyvinyl butyral resin and polyether resin; crosslinkable thermosetting resins such as silicone resin, epoxy resin, phenol resin, urea resin and melamine resin; and photocurable resins such as epoxy acrylate and urethane acrylate. These binding resins can be used alone, or two or more kinds of them can be used in combination.

In addition to the above respective components, various additives such as fluorene compounds, ultraviolet absorbers, plasticizers, surfactants and leveling agents can be added to the photosensitive layer. To improve the sensitivity of the photosensitive layer, for example, sensitizers such as terphenyl, halonaphthoquinones, and acenaphthylene may be used in combination with the electric charge generating material.

To control the sensitivity range of the photosensitive material, other electric charge generating materials may be used in combination. The other electric charge generating agent includes, but is not specifically limited to, powders of inorganic photoconductive materials such as selenium, selenium-tellurium, selenium-arsenic, cadmium sulfide, and α-silicon; azo pigment, bis-azo pigment, perylene pigment, anthanthrone pigment, conventional phthalocyanine pigment other than titanyl phthalocyanine crystal of the present invention, indigo pigment, triphenylmethane pigment, threne pigment, toluidine pigment, pyrrazoline pigment, quinacridone pigment, dithioketopyrrolopyrrole pigment and a mixture thereof.

In the multi-layer type photosensitive layer, the electric charge generating material and binding resin, which constitute the electric charge generating layer, can be incorporated in various ratios, but the electric charge generating material is preferably incorporated in the amount within a range from 5 to 1000 parts by weight, and preferably from 30 to 500parts by weight, based on 100 parts by weight of the binding resin.

When using the titanyl phthalocyanine crystal alone as the electric charge generating material, the amount of the electric charge generating material is an amount of the titanyl phthalocyanine crystal. When using the titanyl phthalocyanine crystal in combination with the other electric charge generating material, the amount of the electric charge generating material is a total amount of them.

When using the titanyl phthalocyanine crystal in combination with the other electric charge generating material, the other electric charge generating material is preferably used in a small amount as far as the effect of the titanyl phthalocyanine crystal is not prevented. Specifically, the other electric charge generating material is preferably incorporated in the amount of 30 parts by weight or less based on 100 parts by weight of the titanyl phthalocyanine crystal.

The electric charge transferring material and binding resin, which constitute the electric charge transferring layer, can be incorporated in various ratios as far as the transfer of the electric charges is not prevented and crystallization does not occur. The electric charge transferring material is preferably incorporated in the amount within a range from 10 to 500 parts by weight, and particularly from 25 to 200 parts by weight, based on 100 parts by weight of the binding resin, so that the electric charges generated by light irradiation in the electric charge generating layer can be transferred easily.

With respect to a thickness of the multi-layer type photosensitive layer, the electric charge generating layer is preferably formed in the thickness within a range from about 0.01 to 5 μm, and particularly from about 0.1 to 3 μm, while the electric charge transferring layer preferably formed in the thickness within a range from about 2 to 100 μm, and particularly from about 5 to 50 μm.

In the single-layer type photosensitive layer, the electric charge generating material is preferably incorporated in the amount within a range from 0.1 to 50 parts by weight, and particularly from 0.5 to 30 parts by weight, based on 100 parts by weight of the binding resin, while the electric charge transferring material is preferably incorporated in the amount within a range from 20 to 500 parts by weight, and particularly from 30 to 200 parts by weight, based on 100 parts by weight of the binding resin.

When using the titanyl phthalocyanine crystal alone as the electric charge generating material, the amount of the electric charge generating material is an amount of the titanyl phthalocyanine crystal. When using the titanyl phthalocyanine crystal in combination with the other electric charge generating material, the amount of the electric charge generating material is a total amount of them.

When using the titanyl phthalocyanine crystal in combination with the other electric charge generating material, the other electric charge generating material is preferably used in a small amount as far as the effect of the titanyl phthalocyanine crystal is not prevented. Specifically, the other electric charge generating material is preferably incorporated in the amount of 100 parts by weight or less based on 100 parts by weight of the titanyl phthalocyanine crystal.

When using only any one of the electron transferring material and hole transferring material as the electric charge transferring material, the amount of the electric charge transferring material is an amount of any one transferring material.

When using the electron transferring material in combination with the hole transferring material as the electric charge transferring material, the amount of the electric charge transferring material is a total amount of them.

When using the electron transferring material in combination with the hole transferring material, the electron transferring material is preferably incorporated in the amount within a range from 10 to 100 parts by weight based on 100 parts by weight of the hole transferring material.

A thickness of the single-layer type photosensitive layer is preferably within a range from about 5 to 100 μm, and particularly from about 10 to 50 μm.

A barrier layer may be formed between the conductive substrate and photosensitive layer in the photosensitive layer having a single-layer type photosensitive layer, whereas, the barrier layer may be formed between the conductive substrate and electric charge generating layer, or between the conductive substrate and electric charge transferring layer, or between the electric charge generating layer and electric charge transferring layer in the photosensitive layer having a multi-layer type photosensitive layer, as far as characteristics of the photosensitive material are prevented. A protective layer may be formed on the surface of the photosensitive material having the single-layer or multi-layer type photosensitive layer.

As the substrate on which the respective layers are formed, for example, various materials having the conductivity can be used. The substrate includes, for example, conductive substrates made of metals such as iron, aluminum, copper, tin, platinum, silver, vanadium, molybdenum, chromium, cadmium, titanium, nickel, palladium, indium, stainless steel and brass; substrates made of plastic materials prepared by depositing or laminating the above metals; and substrates made of glasses coated with aluminum iodide, tin oxide and indium oxide.

The substrate itself may have the conductivity, or the surface of the substrate may have the conductivity. The substrate may be preferably those having a sufficient mechanical strength on use.

The substrate may be in the form of a sheet or drum according to the structure of the image forming apparatus to be used.

When the respective layers constituting the photosensitive layer is formed by the coating method, a dispersion is prepared by dispersing and mixing the above electric charge generating material, electric charge transferring material and binding resin, together with the organic solvent such as tetrahydrofuran, using a known method such as roll mill, ball mill, attritor, paint shaker, and ultrasonic dispersing apparatus, and then the resulting dispersion is coated by using a known means and dried.

The organic solvent for preparing the coating solution for layer containing the titanyl phthalocyanine crystal, such as the single-layer type photosensitive layer and electric charge generating layer among the multi-layer type photosensitive layer include, for example, tetrahydrofuran, toluene, dichloromethane, 1,4-dioxane and a mixture thereof.

The organic solvent for preparing the coating solution for other layers includes, for example, alcohols such as methanol, ethanol, isopropanol and butanol; aliphatic hydrocarbons such as n-hexane, octane and cyclohexane; aromatic hydrocarbons such as benzene and xylene; halogenated hydrocarbons such as dichloroethane, carbon tetrachloride and chlorobenzene; ethers such as dimethyl ether, diethyl ether, tetrahydrofuran, ethylene glycol dimethyl ether and diethylene glycol dimethyl ether; ketones such as acetone, methyl ethyl ketone and cylohexanone; esters such as ethyl acetate and methyl acetate; and dimethylformaldehyde, dimethylformamide, and dimethyl sulfoxide. These solvents can be used alone, or two or more kinds of them can be used in combination.

To improve the dispersion properties of the electric charge generating material and electric charge transferring material, and the smoothness of the surface of the photosensitive layer, for example, surfactants and leveling agents may be added.

<Image Forming Apparatus>

FIG. 1 is a diagram showing schematically an embodiment of an image forming apparatus comprises the above electrophotosensitive material of the present invention.

The electrophotosensitive material 1 used in the image forming apparatus shown in FIG. 1 is obtained by forming a photosensitive layer 11 on the outer peripheral surface of a drum-shaped supporting substrate 10.

The electrophotosensitive material 1 rotates at a fixed speed in one direction (direction of the arrow A) because a shaft center 13 of the supporting substrate 10 is connected to a driving means 14 through a gear or a pulley.

In the vicinity of the electrophotosensitive material 1, a charging means 2 for uniformly charging the surface of the electrophotosensitive material 1, an exposure means 3 for exposing the surface of the electrophotosensitive material 1 to light along an exposure axis 31 in the drawing to form an electrostatic latent image, a developing means 4 for developing the formed electrostatic latent image to form a toner image, a transfer means 5 for transferring the toner image onto the surface of a transfer medium (paper or the like) 8 passed through the space between the transfer means 5 and the electrophotosensitive material 1, a separating means 6 for separating the transfer medium 8, onto which the toner image was transferred, from the surface of the electrophotosensitive material 1, a cleaning means 9 for removing the toner remained on the surface of the electrophotosensitive material 1 after separating the transfer medium 8, and a destaticizing means 7 for exposing the surface of the electrophotosensitive material 1 to light along an exposure axis 71 in the drawing to eliminate a residual potential are disposed in this order along the above rotation direction.

A fixing means 12 for fixing the toner image transferred onto the surface of the transfer medium 8 through the transfer means 5 is disposed downstream of the electrophotosensitive material 1 in the convey direction of the transfer medium 8 indicated by the arrow B in the drawing.

As the fixing means 2, any conventionally known various charging means can be employed.

Specific examples thereof include a charging means 2 of a system (for example, corotron system or scorotron system) for charging the surface of the electrophotosensitive material 1 by applying high voltage to a charge wire provided the vicinity of the surface of the electrophotosensitive material 1 thereby to perform corona discharging, and a charging means 2 of a system for charging by applying charges to the electrophotosensitive material 1 through a charge member such as conductive roller or charge brush contacted with the surface of the electrophotosensitive material 1.

In order to maintain the surface potential of the electrophotosensitive material 1 at a fixed value as possible, a charging means 2 of the method of contacting the charge member with the surface of the electrophotosensitive material 1, or a charging means 2 of the method (scorotron system) of performing corona discharging by providing a grid electrode between the charge wire and the electrophotosensitive material 1 is preferably used.

Although the potential to be applied to the electrophotosensitive material 1 by the charging means 2 varies depending on the construction of the electrophotosensitive material 1, characteristics of the toner and developing conditions, the surface potential (difference in potential with the ground portion) is preferably set within a range from +300 V to +100 V in the case of a common positively charged type electrophotosensitive material.

As the exposure means 3, there can be employed any of various exposure means capable of exposing light having a wavelength (about 600 to 850 nm) to which the electrophotosensitive material 1 exhibits sensitivity, namely, the titanyl phthalocyanine crystal as the electric charge generating material exhibits absorption.

Specific examples of the exposure means 3 include a combination of a semiconductor laser capable of emitting light having the above wavelength and a scanning optical system for scanning light from the semiconductor laser on the surface of the electrophotosensitive material 1.

The light exposure due to the exposure means 3 is preferably set so that a bright potential (surface potential of the exposed portion of the electrophotosensitive material 1) becomes a value as small as possible. Specifically, the exposure is preferably set so that the bright potential of the electrophotosensitive material 1 has the same polarity as that of the surface potential (dark potential) charged by the charging means 2 and is 50 V or less, and preferably 10 V or less or 0 V.

As the developing means 4, any of conventionally known developing means can be employed. For example, dry or wet, contact or non-contact type developing means can be used.

A developing agent used in the developing means 4 may be either of one-component and two-component developing agents.

As the transfer means 5, any of conventionally known contact transfer or non-contact transfer type transfer means can be employed. Specifically, there can be employed various transfer means 5 capable of transferring the toner image on the electrophotosensitive material 1 onto the transfer medium 8 by applying a transfer voltage to the electrophotosensitive material 1 through the transfer medium 8 using a charger, roller, brush or plate.

As the separating means 6, a separating means utilizing corona discharging using the charge wire or a separating means using a conductive roller can be employed, similar to the charging means 2. Among these, a separating means utilizing corona discharging is preferable. A separation voltage to be applied to the electrophotosensitive material 1 using the separating means 6 is generally AC voltage.

As the destaticizing means 7, conventionally known destaticizing lamps such as LED array and fluorescent tube can be used. The destaticizing lamp is preferably a destaticizing lamp capable of irradiating light having a wavelength, to which the electrophotosensitive material 1 is sensitive, in a exposure enough to eliminate the residual charges of the surface.

As the cleaning means 9, there can be employed a conventionally known cleaning means which has a simple mechanism such as blade, fur brush or roller cleaning system, and also exhibits good efficiency for removing the toner.

As the fixing means 12, there can be used a conventionally known fixing means of heat fixing, pressure fixing, heat-pressure fixing or brush fixing system.

EXAMPLES

The following Preparation Examples, Examples and Comparative Examples further illustrate the present invention in detail.

<Titanyl Phthalocyanine Crystal>

Preparation Example 1

(Synthesis of Titanyl Phthalocyanine Compound)

In a flask wherein the atmosphere was replaced by argon, 25 g of o-phthalonitrile, 28 g of titanium tetrabutoxide and 300 g of quinoline were mixed and heated to 150° C.

While vapor generated in the flask was distilled out of the reaction system, the temperature in the system was raised to 215° C. Then, the mixture was reacted by stirring for additional two hours, with the temperature kept at 215° C.

After the completion of the reaction, the temperature in the system was cooled to 150° C. and the reaction mixture was filtered through a glass filter. The resulting solid was washed in turn with N,N-dimethylformamide and methanol, and then vacuum-dried to obtain 24 g of a bule-violet solid.

(Pigmentation Pretreatment)

10 g of the blue-violet solid obtained above was added in 100 ml of N,N-dimethylformamide, followed by a stirring treatment with heating to 130° C. for two hours.

After two hours have passed, heating was terminated and the reaction solution was cooled to room temperature (23±1° C.) and stirring was also terminated. The solution was subjected to a stabilization treatment by allowing to stand in this state for 12 hours.

The stabilized solution was filtered through a glass filter, and then the resulting solid was washed with methanol and vacuum-dried to obtain 9.83 g of a crude crystal of a titanyl phthalocyanine.

(Recrystallization Treatment)

5 g of the crude crystal of the titanyl phthalocyanine obtained by the above pigmentation pretreatment was dissolved in 100 ml of concentrated sulfuric acid.

After the resulting solution was added dropwise in water under ice cooling, the solution was stirred for 15 minutes, and then allowed to stand at normal temperature (23±1° C.) for 30 minutes, thereby to recrystallize the solution.

(Pigmentation Treatment)

The solution was filtered through a glass filter. After washed with water until the wash becomes neutral without drying, the resulting solid was dispersed in 200 ml of chlorobenzene, with water contained therein, and then stirred at 50° C. for 10 hours.

The resulting solution was filtered through a glass filter and the resulting solid was vacuum-dried at 50° C. for five hours to obtain 4.1 g of a non-substituted titanyl phthalocyanine crystal (blue powder) represented by the formula (11-1):

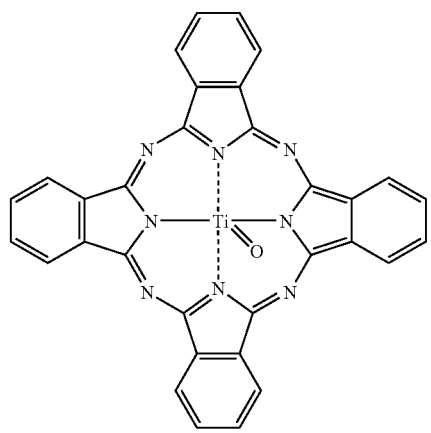

(11-1)

Preparation Example 2

A titanyl phthalocyanine crystal was obtained according to Applied Preparation Example 1 described in Japanese Patent Publication No. 2097121.

Namely, 2 g of non-crystalline titanyl phthalocyanine which was synthesized in the same manner as in Preparation Example 1 before pigmentation pretreatment was put in glass beaker, and then diethyleneglycoldimethylether was added therein until the total amount reached 200 ml.

Then, the resulting solution was stirred at room temperature (23±1° C.) for 24 hours, thereby to obtain a titanyl phthalocyanine crystal.

Preparation Example 3

In the same manner as in Preparation Example 1 described in Japanese Laid Opened Patent Application No. 2001-181531 (2001), a titanyl phthalocyanine crystal was produced.

5 g of the crude crystal obtained by synthesizing in the same manner as in Preparation Example 1 and subjecting to a pigmentation pretreatment was dissolved in 100 ml of a mixed solution of dichloromethane and trifluoroacetic acid (volume ratio: 4:1).

After the resulting solution was added dropwise in a mixed poor solvent of methanol and water (volume ratio: 1:1), the solution was stirred at room temperature for 15 minutes, and then allowed to stand at room temperature (23±1° C.) for 30 minutes, thereby to recrystallize the solution.

The solution was filtered through a glass filter. After washed with water until the wash becomes neutral without drying, the resulting solid was dispersed in 200 ml of chlorobenzene, with water contained therein, and then stirred for one hour.

The resulting solution was filtered through a glass filter and the resulting solid was vacuum-dried at 50° C. for five hours to obtain 4.2 g of a non-substituted titanyl phthalocyanine crystal (blue powder) represented by the formula (11-1). Measurement of CuKα characteristic X-ray diffraction spectrum A sample holder of a X-ray diffraction apparatus [RINT1100, manufactured by Rigaku Corporation] was filled with 0.5 g of each of titanyl phthalocyanine crystals immediately (within 60 minutes) after preparation obtained in the respective Preparation Examples and initial measurement was conducted.

0.5 g of each crystal was dispersed in 5 g of tetrahydrofuran and the solution was stored in a closed system under room temperature/normal humidity conditions of a temperature of 23±1° C. and a relative humidity of 50 to 60% for 7 days. Then, tetrahydrofuran was removed and additional measurement was conducted.

The conditions of the initial measurement and additional measurement are as follows.

X-ray tube: Cu
Tube voltage: 40 kV
Tube current: 30 mA
Start angle: 3.0°
Stop angle: 40.0°
Scanning rate: 10°/min.

Differential scanning calorimetry

Using a differential scanning calorimeter [Model TAS-200, DSC8230D, manufactured by Rigaku Corporation], the differential scanning calorimetry of the titanyl phthalocyanine crystals obtained in the respective Preparation Examples was conducted. The measurement conditions are as follows.

Sample pan: Al
Heating rate: 20° C./min.

The measurement results are shown in FIG. 1 to FIG. 18. The respective Preparation Examples correspond to the respective figures as shown in Table 1.

TABLE 1

Figure 2:
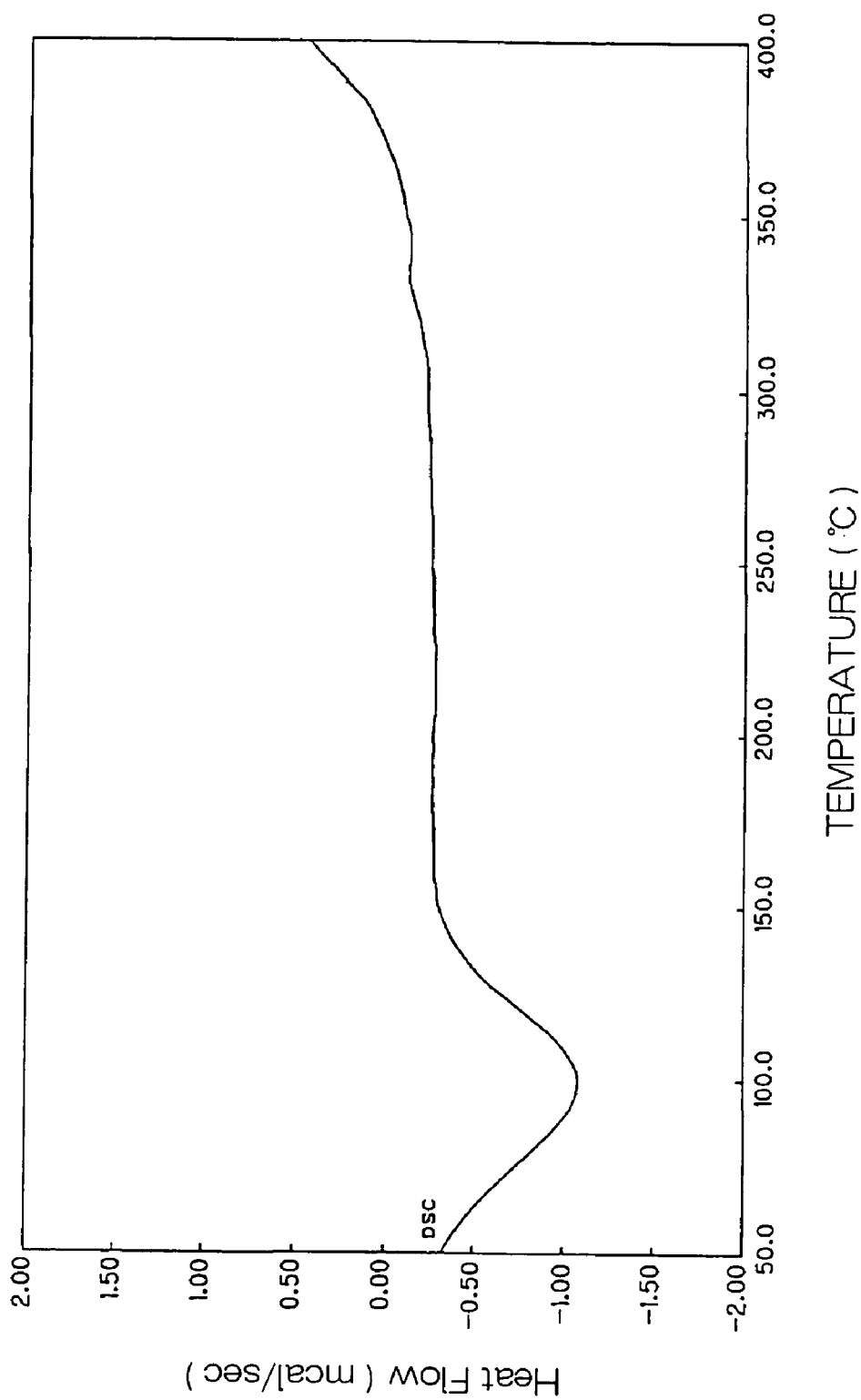
FIG. 2 is a graph showing the results of differential scanning calorimetry of the titanyl phthalocyanine crystal obtained in Preparation Example 1 according to the present invention.
Figure 3:
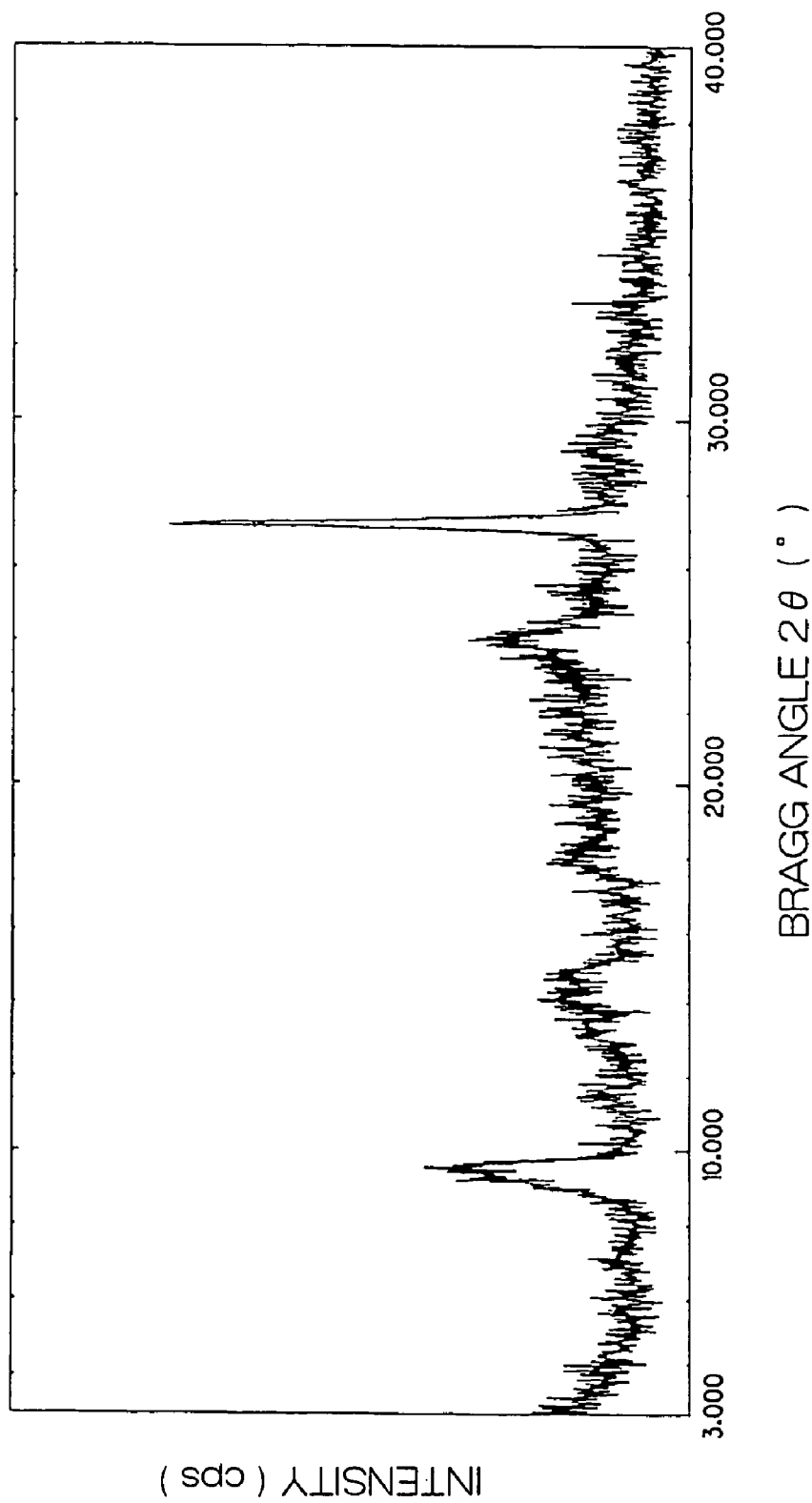
FIG. 3 is a graph showing a CuKα characteristic X-ray diffraction spectrum of the titanyl phthalocyanine crystal of Preparation Example 1 immediately after synthesis.
Figure 4:
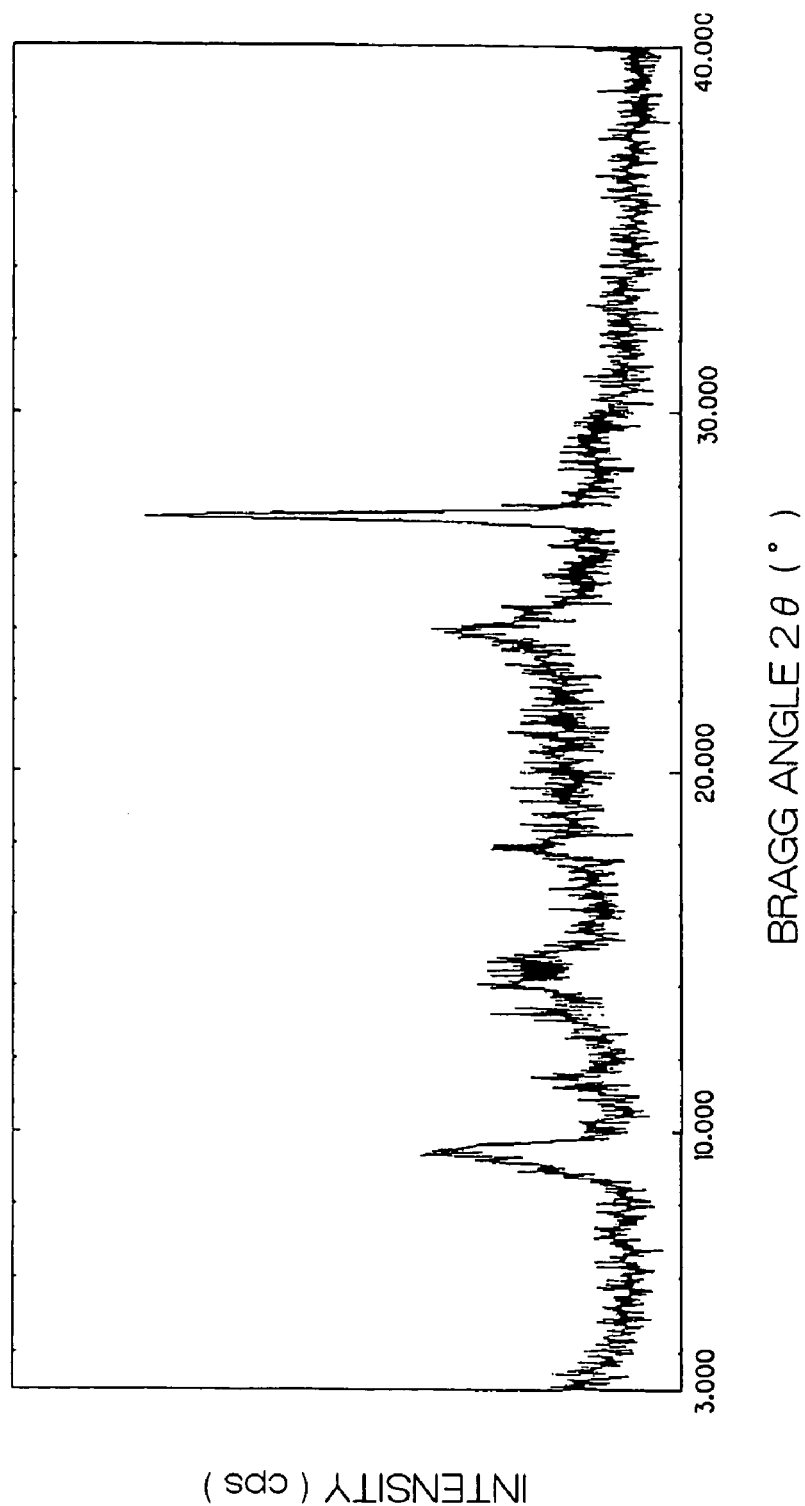
FIG. 4 is a graph showing a CuKα characteristic X-ray diffraction spectrum measured again after dipping the titanyl phthalocyanine crystal of Preparation Example 1 in tetrahydrofuran for 7 days.
Figure 5:
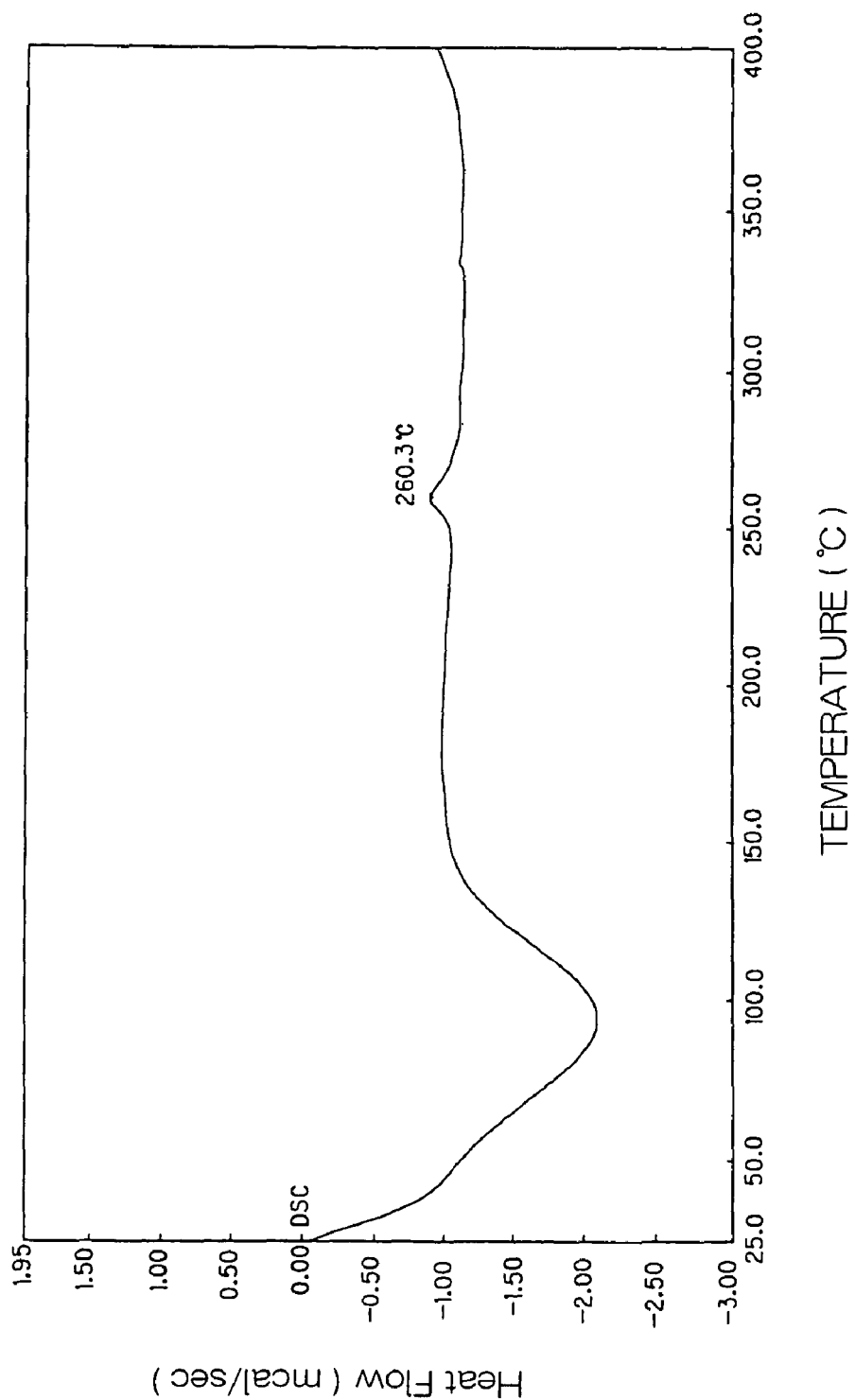
FIG. 5 is a graph showing the results of differential scanning calorimetry of the titanyl phthalocyanine crystal obtained in Preparation Example 2.
Figure 6:
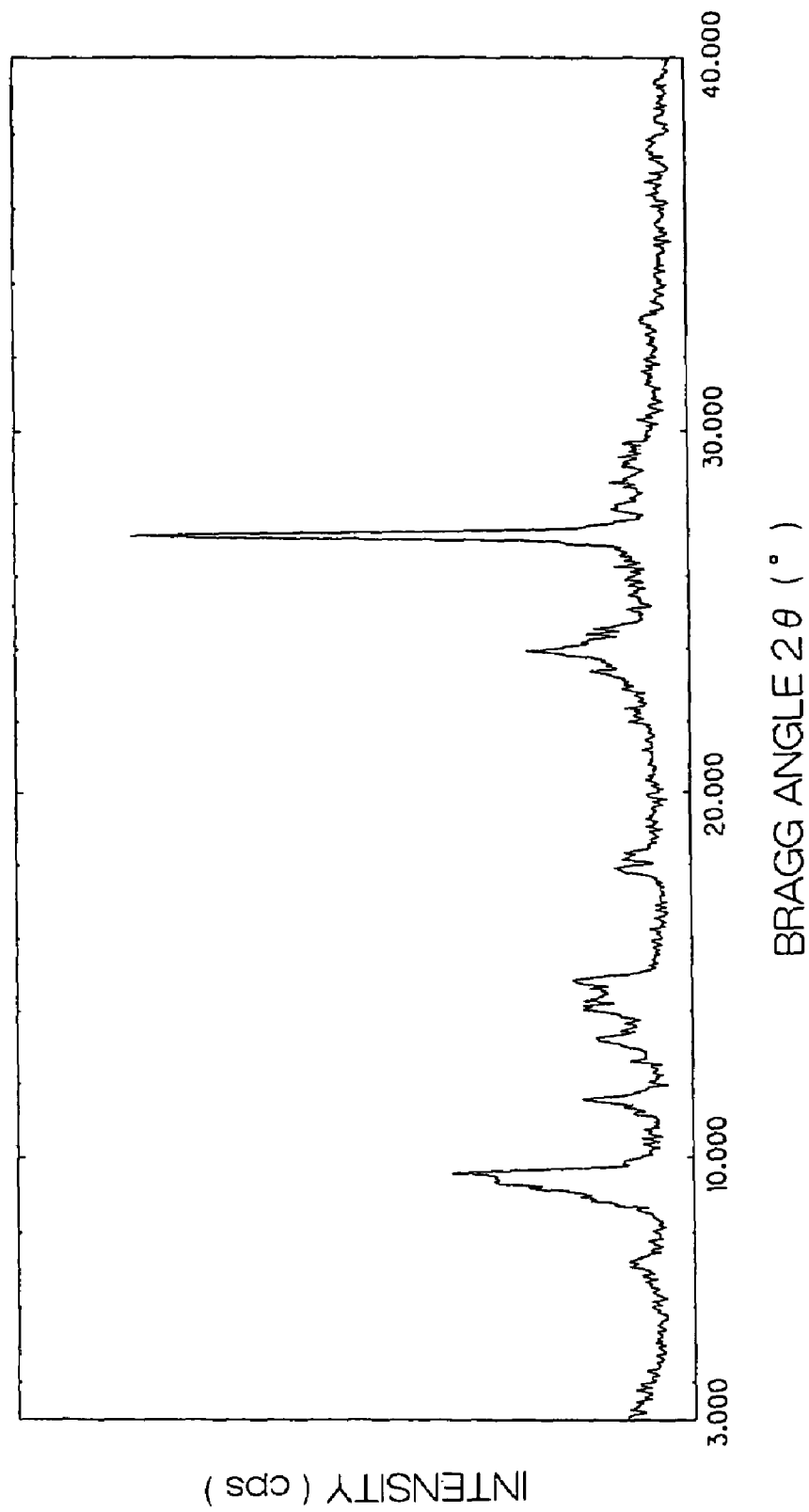
FIG. 6 is a graph showing a CuKα characteristic X-ray diffraction spectrum of the titanyl phthalocyanine crystal of Preparation Example 2 immediately after synthesis.
Figure 7:
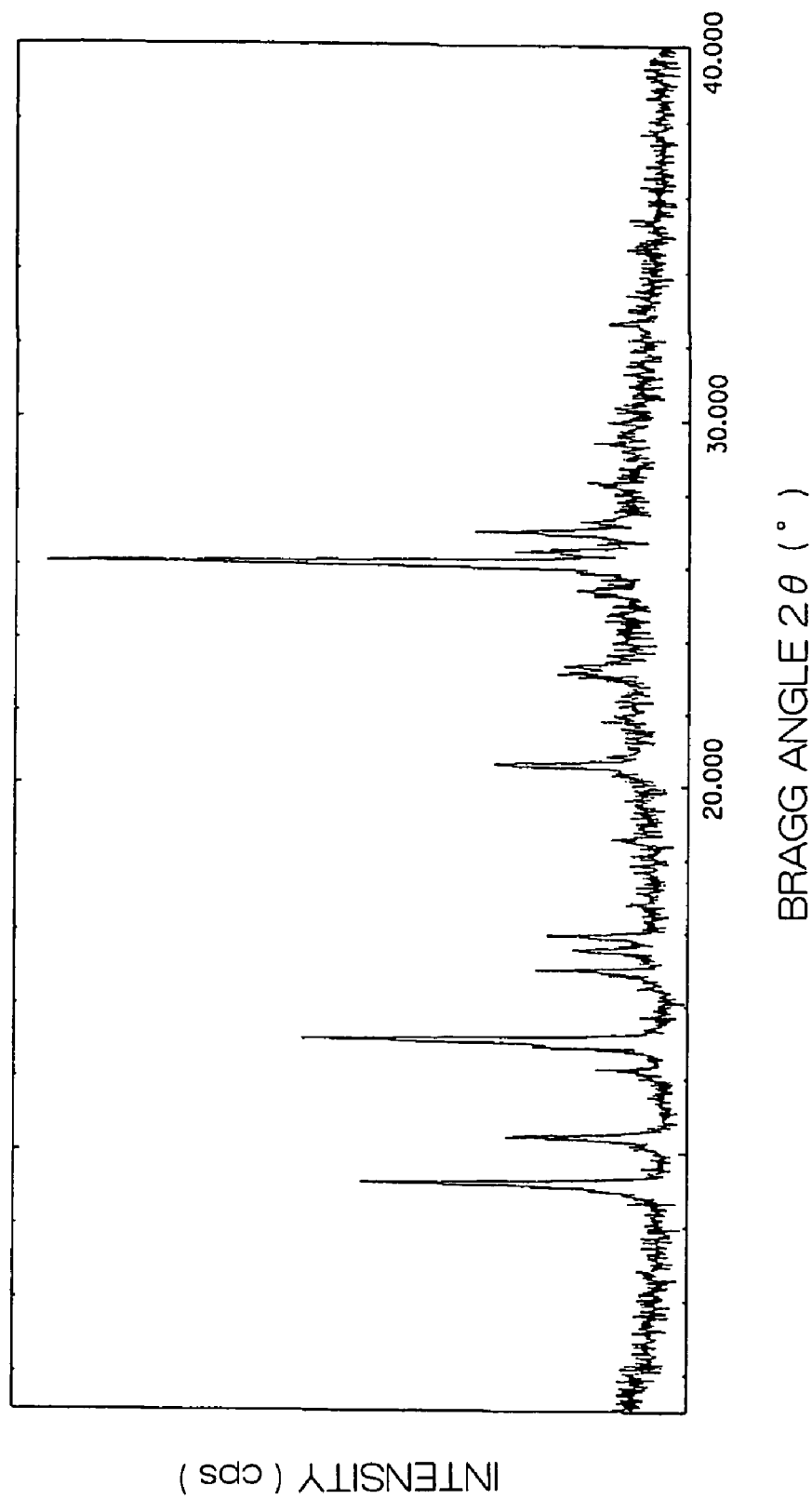
FIG. 7 is a graph showing a CuKα characteristic X-ray diffraction spectrum measured again after dipping the titanyl phthalocyanine crystal of Preparation Example 2 in tetrahydrofuran for 7 days.
Figure 8:
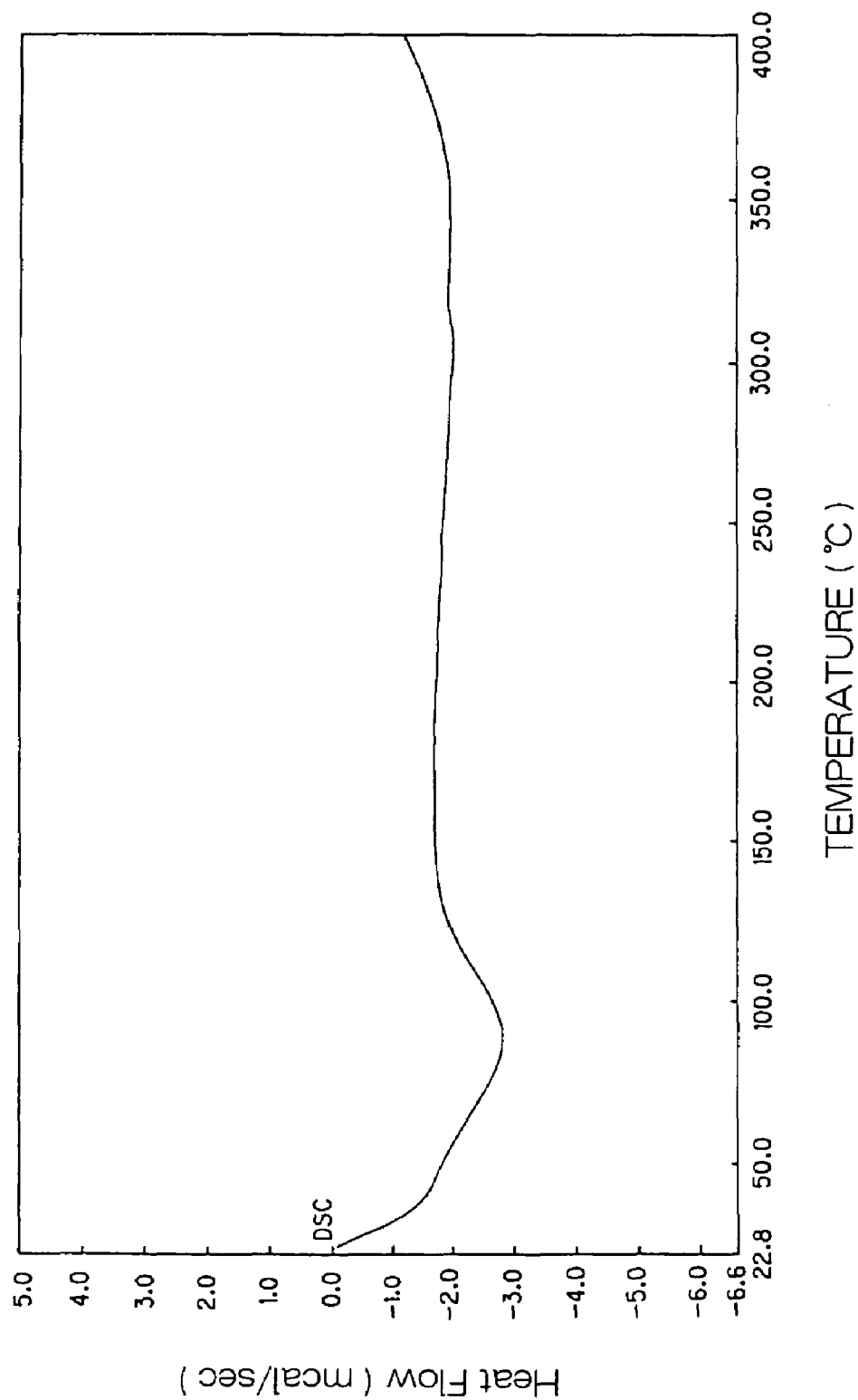
FIG. 8 is a graph showing the results of differential scanning calorimetry of the titanyl phthalocyanine crystal obtained in Preparation Example 3.
Figure 9:
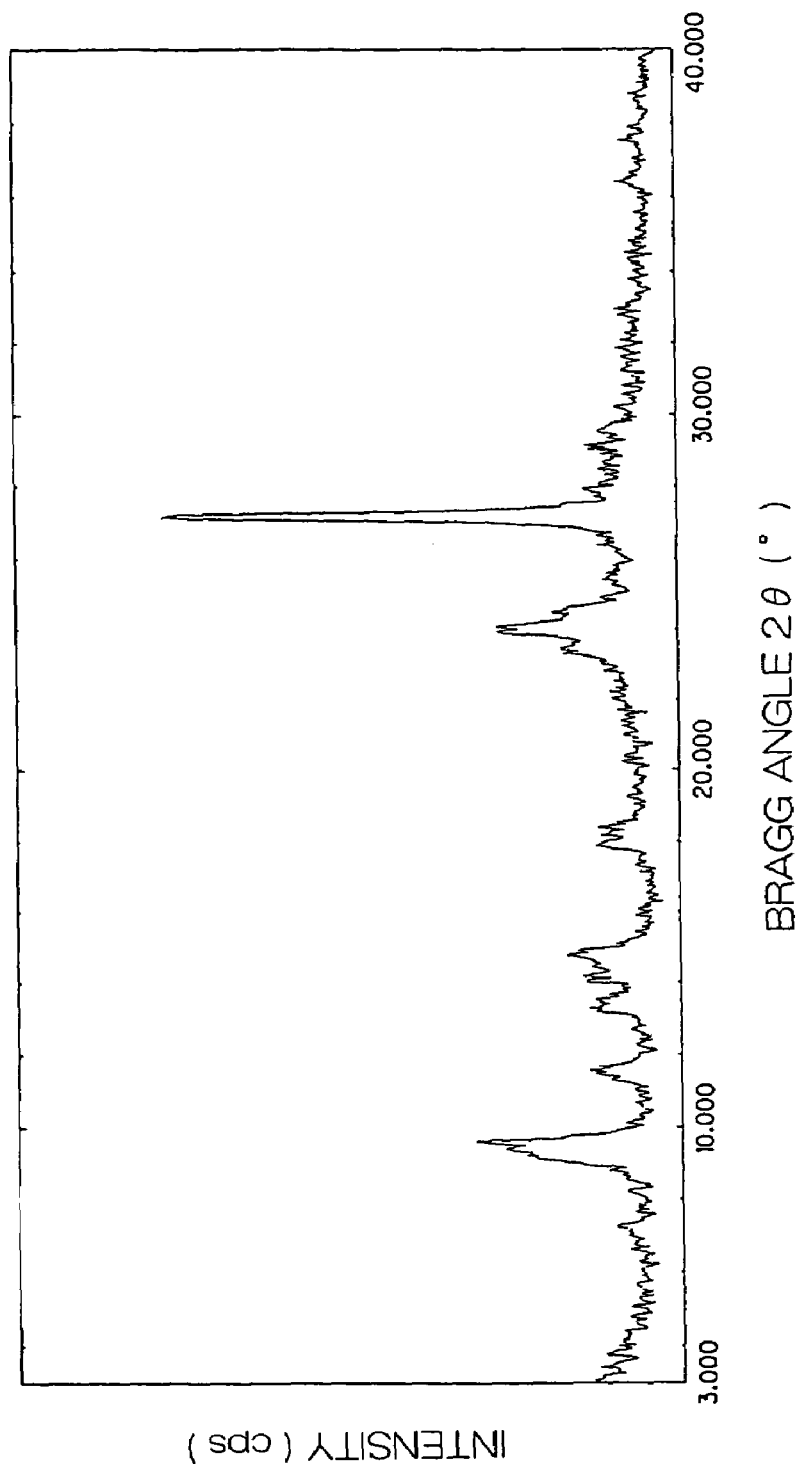
FIG. 9 is a graph showing a CuKα characteristic X-ray diffraction spectrum of the titanyl phthalocyanine crystal of Preparation Example 3 immediately after synthesis.
Figure 10:
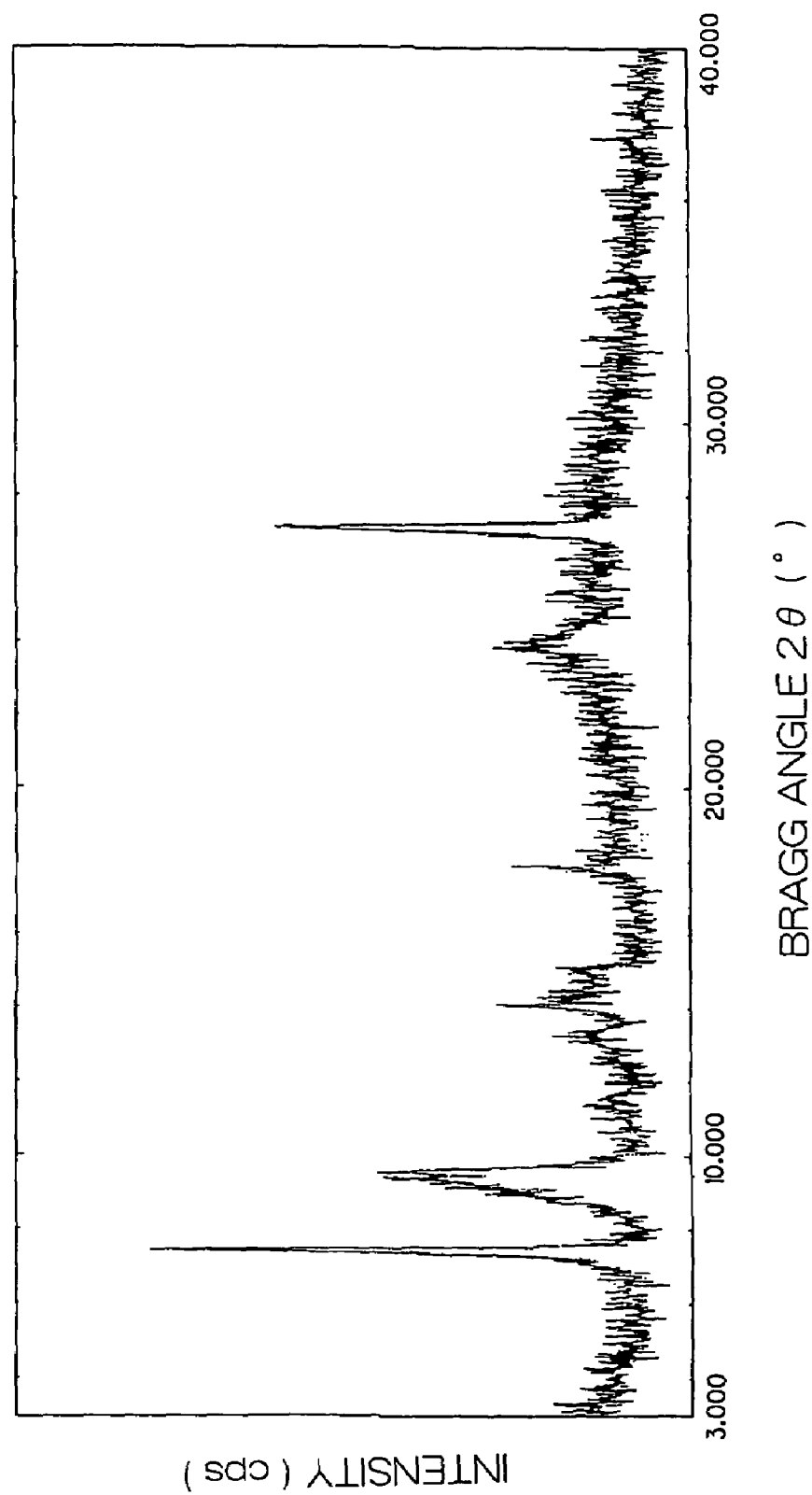
FIG. 10 is a graph showing a CuKα characteristic X-ray diffraction spectrum measured again after dipping the titanyl phthalocyanine crystal of Preparation Example 3 in tetrahydrofuran for 7 days.

|  | Differential scanning calorimetry | CuK α characteristic X-ray diffraction | |
| --- | --- | --- | --- |
|  |  | Initial measurement | additional measurement |
| Preparation Example 1 | FIG. 2 | FIG. 3 | FIG. 4 |
| Preparation Example 2 | FIG. 5 | FIG. 6 | FIG. 7 |
| Preparation Example 3 | FIG. 8 | FIG. 9 | FIG. 10 |

It has been confirmed that the titanyl phthalocyanine crystal within 60 minutes after preparation, which is obtained in Preparation Example 1 has a strong peak at a Bragg angle 2θ±0.2°=27.2°, and has no peak at 7.4° and 26.2° as shown in FIG. 3.

It has been confirmed that, even if the titanyl phthalocyanine crystal of Preparation Example 1 is dipped in tetrahydrofuran for 7 days, no peak appears at a Bragg angle 2θ±0.2°=7.4° and 26.2° as shown in FIG. 4 and, therefore, the crystal retains the same crystal form as that before dipping.

It has been confirmed that the titanyl phthalocyanine crystal of Preparation Example 1 does not show a peak of a change in temperature within a range from 50 to 400° C. except for a peak at about 90° associated with evaporation of adsorbed water as shown in FIG. 2 and, therefore, the crystal hardly cause crystal transfer and is stable.

It has been confirmed that the titanyl phthalocyanine crystal within 60 minutes after preparation, which is obtained in Preparation Example 2 has a strong peak at a Bragg angle 2θ±0.2°=27.2°, and has no peak at 7.4° and 26.2° as shown in FIG. 6.

However, it has been confirmed that, when the titanyl phthalocyanine crystal of Preparation Example 2 is dipped in tetrahydrofuran for 7 days, a peak at a Bragg angle 2θ±0.2°=27.2° decreases and a strong peak appears at 26.2° as shown in FIG. 7 and, therefore, the crystal is transferred to the other crystal forms.

It has been confirmed that the titanylphthalocyanine crystal of Preparation Example 2 show a peak at a temperature within a range from about 247 to 260° C., in addition to a peak at about 90° associated with evaporation of adsorbed water, in differential scanning calorimetry and, therefore, the crystal transfer occurs.

It has been confirmed that the titanyl phthalocyanine crystal within 60 minutes after preparation, which is obtained in Preparation Example 3 has a strong peak at a Bragg angle 2θ±0.2°=27.2°, has a peak at 7.4°, and has no peak at 26.2° as shown in FIG. 9.

It has been confirmed that the titanyl phthalocyanine crystal of Preparation Example 3 does not show a peak of a change in temperature within a range from 50 to 400° C. except for a peak at about 90° associated with evaporation of adsorbed water and, therefore, the crystal hardly cause crystal transfer and is stable.

However, it has been confirmed that, when the titanyl phthalocyanine crystal of Preparation Example 3 is dipped in tetrahydrofuran for 7 days, a peak at a Bragg angle 2θ±0.2°=27.2° decreases and a peak at 7.4° increases as shown in FIG. 10 and, therefore, the crystal is transferred to the other crystal forms.

<Single-Layer Type Electrophotosensitive Material>

Examples 1 to 36

The titanyl phthalocyanine crystal obtained in Preparation Example 1 was used as the electric charge generating material.

5 Parts by weight of the titanyl phthalocyanine crystal, 70 parts by weight of a compound represented by any one of the formulas (HT-1) to (HT-19) as the hole transferring material, 30 parts by weight of a compound represented by any one of the formulas (ET-1) to (ET-6) as the electron transferring material, 100 parts by weight of polycarbonate as the binding resin and 800 parts by weight of tetrahydrofuran were mixed and dispersed using an ultrasonic dispersing apparatus to prepare a coating solution for single-layer type photosensitive layer.

Then, an aluminum substrate having a thickness of 1 mm as the conductive substrate was coated with the coating solution immediately after preparation within about 60 minutes using a wire bar, followed by hot-air drying at 110° C. for 30 minutes to produce an electrophotosensitive material having a single-layer type photosensitive layer of 25 µm in a film thickness.

After the above coating solution was stored in a closed system under the conditions of a temperature of 23±1° C. and a relative humidity of 50 to 60% for 7 days and redispersed using an ultrasonic dispersing apparatus, an aluminum substrate was coated with the coating solution, followed by hot-air drying at 110° C. for 30 minutes to produce an electrophotosensitive material having a single-layer type photosensitive layer of 25 µm in a film thickness.

Comparative Examples 1 to 7

In the same manner as in Examples 1 to 36, except that the titanyl phthalocyanine crystal obtained in Preparation Example 2 was used as the electric charge generating material, a coating solution for single-layer type photosensitive layer was prepared.

Then, an aluminum substrate having a thickness of 1 mm as the conductive substrate was coated with the coating solution immediately after preparation within about 60 minutes using a wire bar, followed by hot-air drying at 110° C. for 30 minutes to produce an electrophotosensitive material having a single-layer type photosensitive layer of 25 µm in a film thickness.

After the above coating solution was stored in a closed system under the conditions of a temperature of 23±1° C. and a relative humidity of 50 to 60% for 7 days and redispersed using an ultrasonic dispersing apparatus, an aluminum substrate was coated with the coating solution, followed by hot-air drying at 110° C. for 30 minutes to produce an electrophotosensitive material having a single-layer type photosensitive layer of 25 µm in a film thickness.

Comparative Examples 8 to 14

In the same manner as in Examples 1 to 36, except that the titanyl phthalocyanine crystal obtained in Preparation Example 3 was used as the electric charge generating material, a coating solution for single-layer type photosensitive layer was prepared.

Then, an aluminum substrate having a thickness of 1 mm as the conductive substrate was coated with the coating solution immediately after preparation within about 60 minutes using a wire bar, followed by hot-air drying at 110° C.

for 30 minutes to produce an electrophotosensitive material having a single-layer type photosensitive layer of 25 μm in a film thickness.

After the above coating solution was stored in a closed system under the conditions of a temperature of 23±1° C. and a relative humidity of 50 to 60% for 7 days and redispersed using an ultrasonic dispersing apparatus, an aluminum substrate was coated with the coating solution, followed by hot-air drying at 110° C. for 30 minutes to produce an electrophotosensitive material having a single-layer type photosensitive layer of 25 μm in a film thickness.

Sensitivity Characteristic Test (1)

Using a drum sensitivity tester, the photosensitive materials produced in the respective Examples and Comparative Examples were charged to a surface potential of +700 V by corona discharging.

The surface of each photosensitive material was irradiated with monochromic light having a wavelength of 780 nm (half-width: 20 nm, light intensity: 8 μW/cm$^2$) through a band-pass filter for 1.5 seconds, and then a surface potential at the time at which 0.5 seconds have passed since the beginning of exposure was measured as a potential after exposure.

The sensitivity characteristics of the respective photosensitive materials were evaluated by a potential after exposure $Vr_1$ (V) of the electrophotosensitive material whose photosensitive layer was formed by using the coating solution immediately after preparation, a potential after exposure $Vr_2$ (V) of the electrophotosensitive material whose photosensitive layer was formed by using the coating solution after storing for 7 days, and a difference $\Delta Vr$ (V)$=Vr_2-Vr_1$.

The results are shown in Table 2 to Table 6.

TABLE 2

| | CGM | HTM | ETM | $Vr_1$(V) | $Vr_2$(V) | $\Delta Vr$(V) |
|---|---|---|---|---|---|---|
| Ex.1 | P.Ex.1 | HT-12 | ET-1 | 138 | 139 | 1 |
| Ex.2 | P.Ex.1 | HT-14 | ET-1 | 137 | 136 | -1 |
| Ex.3 | P.Ex.1 | HT-1 | ET-1 | 131 | 130 | -1 |
| Ex.4 | P.Ex.1 | HT-1 | ET-5 | 148 | 149 | 1 |
| Ex.5 | P.Ex.1 | HT-6 | ET-1 | 178 | 178 | 0 |
| Ex.6 | P.Ex.1 | HT-6 | ET-5 | 168 | 168 | 0 |
| Ex.7 | P.Ex.1 | HT-7 | ET-1 | 126 | 128 | 2 |
| Ex.8 | P.Ex.1 | HT-7 | ET-3 | 118 | 119 | 1 |
| Ex.9 | P.Ex.1 | HT-7 | ET-6 | 135 | 137 | 2 |
| Ex.10 | P.Ex.1 | HT-9 | ET-1 | 108 | 107 | -1 |
| Ex.11 | P.Ex.1 | HT-9 | ET-3 | 94 | 94 | 0 |
| Ex.12 | P.Ex.1 | HT-16 | ET-1 | 157 | 156 | -1 |
| Ex.13 | P.Ex.1 | HT-16 | ET-2 | 150 | 150 | 0 |
| Ex.14 | P.Ex.1 | HT-16 | ET-5 | 177 | 178 | 1 |

TABLE 3

| | CGM | HTM | ETM | $Vr_1$(V) | $Vr_2$(V) | $\Delta Vr$(V) |
|---|---|---|---|---|---|---|
| Ex.15 | P.Ex.1 | HT-2 | ET-2 | 137 | 135 | -2 |
| Ex.16 | P.Ex.1 | HT-5 | ET-2 | 177 | 175 | -2 |
| Ex.17 | P.Ex.1 | HT-10 | ET-2 | 120 | 122 | 2 |
| Ex.18 | P.Ex.1 | HT-15 | ET-2 | 150 | 151 | 1 |
| Ex.19 | P.Ex.1 | HT-3 | ET-3 | 119 | 122 | 3 |
| Ex.20 | P.Ex.1 | HT-11 | ET-3 | 99 | 100 | 1 |
| Ex.21 | P.Ex.1 | HT-17 | ET-3 | 134 | 138 | 4 |
| Ex.22 | P.Ex.1 | HT-19 | ET-3 | 130 | 132 | 2 |

TABLE 4

| | CGM | HTM | ETM | $Vr_1$(V) | $Vr_2$(V) | $\Delta Vr$(V) |
|---|---|---|---|---|---|---|
| Ex.23 | P.Ex.1 | HT-3 | ET-4 | 122 | 121 | -1 |
| Ex.24 | P.Ex.1 | HT-4 | ET-4 | 140 | 142 | 2 |
| Ex.25 | P.Ex.1 | HT-8 | ET-4 | 122 | 122 | 0 |
| Ex.26 | P.Ex.1 | HT-11 | ET-4 | 115 | 113 | -2 |
| Ex.27 | P.Ex.1 | HT-15 | ET-4 | 140 | 140 | 0 |
| Ex.28 | P.Ex.1 | HT-18 | ET-4 | 127 | 129 | 2 |
| Ex.29 | P.Ex.1 | HT-4 | ET-5 | 169 | 170 | 1 |
| Ex.30 | P.Ex.1 | HT-11 | ET-5 | 135 | 134 | -1 |
| Ex.31 | P.Ex.1 | HT-19 | ET-5 | 147 | 147 | 0 |
| Ex.32 | P.Ex.1 | HT-2 | ET-6 | 122 | 121 | -1 |
| Ex.33 | P.Ex.1 | HT-3 | ET-6 | 140 | 142 | 2 |
| Ex.34 | P.Ex.1 | HT-10 | ET-6 | 122 | 122 | 0 |
| Ex.35 | P.Ex.1 | HT-17 | ET-6 | 115 | 113 | -2 |
| Ex.36 | P.Ex.1 | HT-19 | ET-6 | 140 | 140 | 0 |

TABLE 5

| | CGM | HTM | ETM | $Vr_1$(V) | $Vr_2$(V) | $\Delta Vr$(V) |
|---|---|---|---|---|---|---|
| C.Ex.1 | P.Ex.2 | HT-12 | ET-1 | 138 | 589 | 451 |
| C.Ex.2 | P.Ex.2 | HT-14 | ET-1 | 140 | 577 | 437 |
| C.Ex.3 | P.Ex.2 | HT-1 | ET-1 | 129 | 603 | 474 |
| C.Ex.4 | P.Ex.2 | HT-6 | ET-1 | 183 | 621 | 438 |
| C.Ex.5 | P.Ex.2 | HT-7 | ET-1 | 131 | 630 | 499 |
| C.Ex.6 | P.Ex.2 | HT-9 | ET-1 | 108 | 555 | 447 |
| C.Ex.7 | P.Ex.2 | HT-16 | ET-1 | 162 | 625 | 463 |

TABLE 6

| | CGM | HTM | ETM | $Vr_1$(V) | $Vr_2$(V) | $\Delta Vr$(V) |
|---|---|---|---|---|---|---|
| C.Ex.8 | P.Ex.3 | HT-12 | ET-1 | 139 | 155 | 16 |
| C.Ex.9 | P.Ex.3 | HT-14 | ET-1 | 137 | 155 | 18 |
| C.Ex.10 | P.Ex.3 | HT-1 | ET-1 | 130 | 175 | 45 |
| C.Ex.11 | P.Ex.3 | HT-6 | ET-1 | 178 | 210 | 32 |
| C.Ex.12 | P.Ex.3 | HT-7 | ET-1 | 128 | 151 | 23 |
| C.Ex.13 | P.Ex.3 | HT-9 | ET-1 | 106 | 126 | 20 |
| C.Ex.14 | P.Ex.3 | HT-16 | ET-1 | 158 | 180 | 22 |

As is apparent from the tables described above, regarding the electrophotosensitive materials of Comparative Examples 1 to 7 using the titanyl phthalocyanine crystal of Preparation Example 2, the potential after exposure $Vr_2$ (V) of the photosensitive material wherein the single-layer type photosensitive layer was formed using the coating solution stored for 7 days after preparation was drastically increased as compared with the potential after exposure $Vr_1$ (V) of the photosensitive material wherein the single-layer type photosensitive layer was formed using the coating solution immediately after preparation. This fact showed that the sensitivity characteristics of the photosensitive material were drastically lowered by the storage of the coating solution in the titanyl phthalocyanine crystal of Preparation Example 2.

Regarding the electrophotosensitive materials of Comparative Examples 8 to 14 using the titanyl phthalocyanine crystal of Preparation Example 3, the potential after exposure $Vr_2$ (V) of the photosensitive material wherein the single-layer type photosensitive layer was formed using the coating solution stored for 7 days after preparation was drastically increased as compared with the potential after exposure $Vr_1$ (V) of the photosensitive material wherein the single-layer type photosensitive layer was formed using the coating solution immediately after preparation, although the degree of increase was lower than that of Preparation Example 2.

On the other hand, regarding the electrophotosensitive materials Examples 1 to 36 using the titanyl phthalocyanine crystal of Preparation Example 1 of the present invention, the potential after exposure $Vr_1$ (V) and the potential after exposure $Vr_2$ (V) were scarcely changed. This fact showed that the photosensitive material having good sensitivity characteristics, that are always stable regardless of the lapsed time after preparing the coating solution, by using the titanyl phthalocyanine crystal of Preparation Example 1.

Repeating Stability Test

The charging process of charging electrophotosensitive materials wherein a photosensitive layer was formed using a coating solution immediately after preparation among electrophotosensitive materials produced in Example 3 and Comparative Example 10 a surface potential of +800 V by corona discharging using a drum sensitivity tester, and the exposure process of exposing the surface of each electrophotosensitive material to monochromic light having a wavelength of 780 nm and a half-width of 20 nm and a light intensity of 8 µW/cm$^2$ through a band-pass filter for 1.5 seconds were repeated 500 times. Then, the surface potential $VO_{500}$ (V) after repeating 500 times was measured.

A difference between the measured surface potential $VO_{500}$ (V) and a target value of the surface potential $VO_0$ (V) [=800 V], $\Delta VO$ (V)=$VO_{500}-V_0$, was determined and repeating stability of both photosensitive materials was evaluated.

The results are shown in Table 7.

TABLE 7

| | CGM | HTM | ETM | $VO_0$(V) | $VO_{500}$(V) | $\Delta VO$(V) |
|---|---|---|---|---|---|---|
| Ex.3 | P.Ex.1 | HT-1 | ET-1 | 800 | 775 | −25 |
| C.Ex.10 | P.Ex.3 | HT-1 | ET-1 | 800 | 680 | −120 |

As is apparent from the table, the electrophotosensitive material using the titanyl phthalocyanine crystal of Preparation Example 3 of Comparative Example 10 is not insufficient in repeating stability because the surface potential was drastically decreased by repeating the charging and exposure processes 500 times.

On the other hand, it has been confirmed that electrophotosensitive material using the titanyl phthalocyanine crystal of Preparation Example 1 of Example 3 is excellent in repeating stability because the surface potential was slightly decreased even when the charging and exposure processes were repeated 500 times.

<Multi-Layer Type Electrophotosensitive Material>

Examples 37 to 55

The titanyl phthalocyanine crystal obtained in Preparation Example 1 was used as the electric charge generating material.

2.5 Parts by weight of the titanyl phthalocyanine crystal, 1 part by weight of polyvinyl butyral as the binding resin and 15 parts by weight of tetrahydrofuran were mixed and dispersed using an ultrasonic dispersing apparatus to prepare a coating solution for electric charge generating layer among a multi-layer type photosensitive layer.

Then, an aluminum substrate having a thickness of 1 mm as the conductive substrate was coated with the coating solution immediately after preparation within about 60 minutes using a wire bar, followed by hot-air drying at 110° C. for 30 minutes to form an electric charge generating layer of 0.5 µm in a film thickness.

1 part by weight of a compound represented by any one of the formulas (HT-1) to (HT-19) as the hole transferring material, 1 part by weight of polycarbonate as the binding resin and 10 parts by weight of toluene were mixed and dispersed using an ultrasonic dispersing apparatus to prepare a coating solution for electric charge transferring layer. Then, this coating solution was coated on the electric charge generating layer using a wire bar, followed by hot-air drying at 110° C. for 30 minutes to form an electric charge transferring layer of 20 µm in a film thickness, thus producing an electrophotosensitive material having a multi-layer type photosensitive layer.

After the above coating solution was stored in a closed system under the conditions of a temperature of 23±1° C. and a relative humidity of 50 to 60% for 7 days and redispersed using an ultrasonic dispersing apparatus, an aluminum substrate was coated with the coating solution, followed by hot-air drying at 110° C. for 30 minutes to form an electric charge generating layer of 0.5 µm in a film thickness.

Then, the same coating solution for electric charge transferring layer was coated on the electric charge generating layer using a wire bar, followed by hot-air drying at 110° C. for 30 minutes to form an electric charge transferring layer of 20 µm in a film thickness, thus producing an electrophotosensitive material having a multi-layer type photosensitive layer.

Comparative Examples 15 to 28

In the same manner as in Examples 37 to 55, except that the titanyl phthalocyanine crystal obtained in Preparation Example 2 was used as the electric charge generating material, a coating solution for electric charge generating layer among a multi-layer type photosensitive layer was prepared.

Then, an aluminum substrate having a thickness of 1 mm as the conductive substrate was coated with the coating solution for electric charge generating layer immediately after preparation within about 60 minutes using a wire bar, followed by hot-air drying at 110° C. for 30 minutes to form an electric charge generating layer of 0.5 µm in a film thickness. Then, the same coating solution for electric charge transferring layer was coated on the electric charge generating layer using a wire bar, followed by hot-air drying at 110° C. for 30 minutes to form an electric charge transferring layer of 20 µm in a film thickness, thus producing an electrophotosensitive material having a multi-layer type photosensitive layer.

After the above coating solution was stored in a closed system under the conditions of a temperature of 23±1° C. and a relative humidity of 50 to 60% for 7 days and redispersed using an ultrasonic dispersing apparatus, an aluminum substrate was coated with the coating solution, followed by hot-air drying at 110° C. for 30 minutes to form an electric charge generating layer of 0.5 µm in a film thickness.

Then, the same coating solution for electric charge transferring layer was coated on the electric charge generating layer using a wire bar, followed by hot-air drying at 110° C. for 30 minutes to form an electric charge transferring layer of 20 µm in a film thickness, thus producing an electrophotosensitive material having a multi-layer type photosensitive layer.

Comparative Examples 29 to 42

In the same manner as in Examples 37 to 55, except that the titanyl phthalocyanine crystal obtained in Preparation Example 3 was used as the electric charge generating material, a coating solution for electric charge generating layer among a multi-layer type photosensitive layer was prepared.

Then, an aluminum substrate having a thickness of 1 mm as the conductive substrate was coated with the coating solution for electric charge generating layer immediately after preparation within about 60 minutes using a wire bar, followed by hot-air drying at 110° C. for 30 minutes to form an electric charge generating layer of 0.5 μm in a film thickness. Then, the same coating solution for electric charge transferring layer was coated on the electric charge generating layer using a wire bar, followed by hot-air drying at 110° C. for 30 minutes to form an electric charge transferring layer of 20 μm in a film thickness, thus producing an electrophotosensitive material having a multi-layer type photosensitive layer.

After the above coating solution was stored in a closed system under the conditions of a temperature of 23±1° C. and a relative humidity of 50 to 60% for 7 days and redispersed using an ultrasonic dispersing apparatus, an aluminum substrate was coated with the coating solution, followed by hot-air drying at 110° C. for 30 minutes to form an electric charge generating layer of 0.5 μm in a film thickness.

Then, the same coating solution for electric charge transferring layer was coated on the electric charge generating layer using a wire bar, followed by hot-air drying at 110° C. for 30 minutes to form an electric charge transferring layer of 20 μm in a film thickness, thus producing an electrophotosensitive material having a multi-layer type photosensitive layer.

Sensitivity Characteristic Test (2)

Using a drum sensitivity tester, the photosensitive materials produced in the respective Examples and Comparative Examples were charged to a surface potential of −700 V by corona discharging.

The surface of each photosensitive material was irradiated with monochromic light having a wavelength of 780 nm (half-width: 20 nm, light intensity: 8 μW/cm$^2$) through a band-pass filter for 1.5 seconds, and then a surface potential at the time at which 0.5 seconds have passed since the beginning of exposure was measured as a potential after exposure.

The sensitivity characteristics of the respective photosensitive materials were evaluated by a potential after exposure $Vr_1$ (V) of the electrophotosensitive material whose electric charge generating layer was formed by using the coating solution immediately after preparation, a potential after exposure $Vr_2$ (V) of the electrophotosensitive material whose electric charge generating layer was formed by using the coating solution after storing for 7 days, and a difference $\Delta Vr$ (V) = $Vr_2 - Vr_1$.

The results are shown in Table 8 to Table 10.

TABLE 8

|  | CGM | HTM | $Vr_1$(V) | $Vr_2$(V) | $\Delta Vr$(V) |
|---|---|---|---|---|---|
| Ex.37 | P.Ex.1 | HT-1 | −130 | −133 | −3 |
| Ex.38 | P.Ex.1 | HT-2 | −108 | −111 | −3 |
| Ex.39 | P.Ex.1 | HT-5 | −175 | −177 | −2 |

TABLE 8-continued

|  | CGM | HTM | $Vr_1$(V) | $Vr_2$(V) | $\Delta Vr$(V) |
|---|---|---|---|---|---|
| Ex.40 | P.Ex.1 | HT-7 | −107 | −109 | −2 |
| Ex.41 | P.Ex.1 | HT-9 | −88 | −90 | −2 |
| Ex.42 | P.Ex.1 | HT-11 | −100 | −102 | −2 |
| Ex.43 | P.Ex.1 | HT-12 | −120 | −123 | −3 |
| Ex.44 | P.Ex.1 | HT-13 | −122 | −121 | 1 |
| Ex.45 | P.Ex.1 | HT-14 | −124 | −125 | −1 |
| Ex.46 | P.Ex.1 | HT-15 | −140 | −138 | 2 |
| Ex.47 | P.Ex.1 | HT-16 | −138 | −138 | 0 |
| Ex.48 | P.Ex.1 | HT-17 | −133 | −135 | −2 |
| Ex.49 | P.Ex.1 | HT-18 | −130 | −134 | −4 |
| Ex.50 | P.Ex.1 | HT-19 | −132 | −132 | 0 |
| Ex.51 | P.Ex.1 | HT-3 | −255 | −255 | 0 |
| Ex.52 | P.Ex.1 | HT-4 | −112 | −113 | −1 |
| Ex.53 | P.Ex.1 | HT-6 | −140 | −144 | −4 |
| Ex.54 | P.Ex.1 | HT-8 | −111 | −111 | 0 |
| Ex.55 | P.Ex.1 | HT-10 | −94 | −94 | 0 |

TABLE 9

|  | CGM | HTM | $Vr_1$(V) | $Vr_2$(V) | $\Delta Vr$(V) |
|---|---|---|---|---|---|
| C.Ex.15 | P.Ex.2 | HT-1 | −131 | −602 | −471 |
| C.Ex.16 | P.Ex.2 | HT-2 | −112 | −575 | −463 |
| C.Ex.17 | P.Ex.2 | HT-5 | −177 | −601 | −424 |
| C.Ex.18 | P.Ex.2 | HT-7 | −111 | −589 | −478 |
| C.Ex.19 | P.Ex.2 | HT-9 | −92 | −580 | −488 |
| C.Ex.20 | P.Ex.2 | HT-11 | −100 | −579 | −479 |
| C.Ex.21 | P.Ex.2 | HT-12 | −122 | −599 | −477 |
| C.Ex.22 | P.Ex.2 | HT-13 | −124 | −611 | −487 |
| C.Ex.23 | P.Ex.2 | HT-14 | −124 | −605 | −481 |
| C.Ex.24 | P.Ex.2 | HT-15 | −145 | −610 | −465 |
| C.Ex.25 | P.Ex.2 | HT-16 | −141 | −595 | −454 |
| C.Ex.26 | P.Ex.2 | HT-17 | −133 | −593 | −460 |
| C.Ex.27 | P.Ex.2 | HT-18 | −132 | −598 | −466 |
| C.Ex.28 | P.Ex.2 | HT-19 | −133 | −587 | −454 |

TABLE 10

|  | CGM | HTM | $Vr_1$(V) | $Vr_2$(V) | $\Delta Vr$(V) |
|---|---|---|---|---|---|
| C.Ex.29 | P.Ex.3 | HT-1 | −130 | −191 | −61 |
| C.Ex.30 | P.Ex.3 | HT-2 | −110 | −185 | −75 |
| C.Ex.31 | P.Ex.3 | HT-5 | −110 | −234 | −124 |
| C.Ex.32 | P.Ex.3 | HT-7 | −110 | −175 | −65 |
| C.Ex.33 | P.Ex.3 | HT-9 | −90 | −162 | −72 |
| C.Ex.34 | P.Ex.3 | HT-11 | −102 | −165 | −63 |
| C.Ex.35 | P.Ex.3 | HT-12 | −125 | −190 | −65 |
| C.Ex.36 | P.Ex.3 | HT-13 | −122 | −185 | −63 |
| C.Ex.37 | P.Ex.3 | HT-14 | −123 | −187 | −64 |
| C.Ex.38 | P.Ex.3 | HT-15 | −145 | −211 | −66 |
| C.Ex.39 | P.Ex.3 | HT-16 | −140 | −201 | −61 |
| C.Ex.40 | P.Ex.3 | HT-17 | −132 | −195 | −63 |
| C.Ex.41 | P.Ex.3 | HT-18 | −132 | −190 | −58 |
| C.Ex.42 | P.Ex.3 | HT-19 | −134 | −188 | −54 |

As is apparent from the tables described above, regarding the electrophotosensitive materials of Comparative Examples 15 to 28 using the titanyl phthalocyanine crystal of Preparation Example 2, the potential after exposure $Vr_2$ (V) of the photosensitive material wherein the electric charge generating layer was formed using the coating solution stored for 7 days after preparation was drastically increased as compared with the potential after exposure $Vr_1$ (V) of the photosensitive material wherein the electric charge generating layer was formed using the coating solution immediately after preparation. This fact showed that the sensitivity characteristics of the photosensitive material were drastically lowered by the storage of the coating solution in the titanyl phthalocyanine crystal of Preparation Example 2.

Regarding the electrophotosensitive materials of Comparative Examples 29 to 42 using the titanyl phthalocyanine crystal of Preparation Example 3, the potential after exposure $Vr_2$ (V) of the photosensitive material wherein the electric charge generating layer was formed using the coating solution stored for 7 days after preparation was drastically increased as compared with the potential after exposure $Vr_1$ (V) of the photosensitive material wherein the electric charge generating layer was formed using the coating solution immediately after preparation, although the degree of increase was lower than that of Preparation Example 2.

Stability Test after Isolation

The photosensitive layers were peeled off from the single-layer type electrophotosensitive materials produced in Example 1 and then dissolved in tetrahydrofuran under the conditions of a temperature of 23±1° C. and a relative humidity of 50 to 60%.

After a titanyl phthalocyanine crystal was isolated by filtering the resulting solution, the CuKα characteristic X-ray diffraction of the titanyl phthalocyanine crystal immediately after isolation and that of the titanyl phthalocyanine crystal recovered after isolating from the photosensitive layer and dispersing and dipping in tetrahydrofuran for 7 days under the conditions of a temperature of 23±1° C. and a relative humidity of 50 to 60% in a closed system were measured respectively in the same manner as described above.

Figure 11:
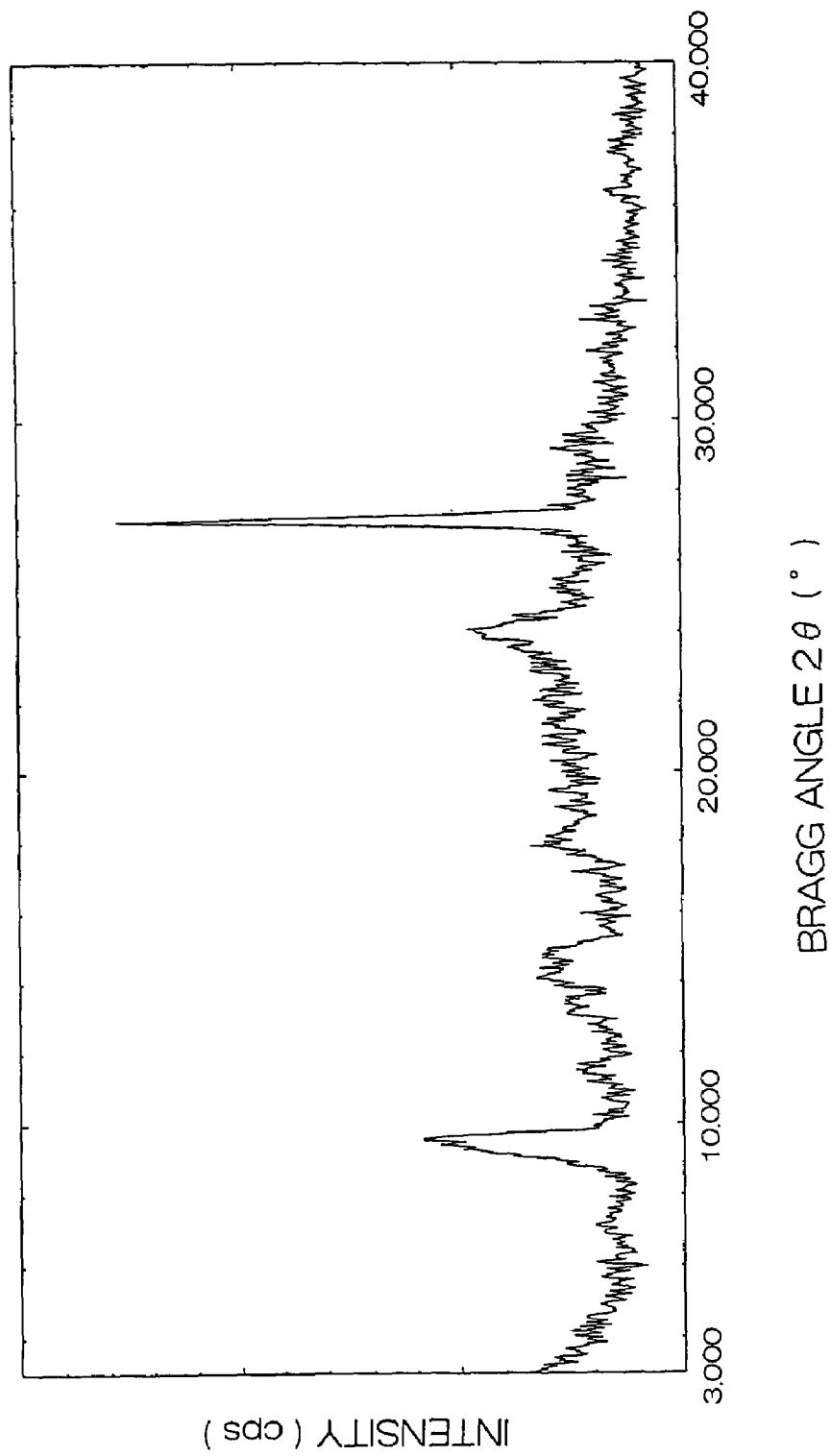
FIG. 11 is a graph showing a CuKα characteristic X-ray diffraction spectrum of the titanyl phthalocyanine crystal of Preparation Example 1 isolating from the photosensitive layer of the photo sensitive material produced in Example 1 immediately after isolation.
Figure 12:
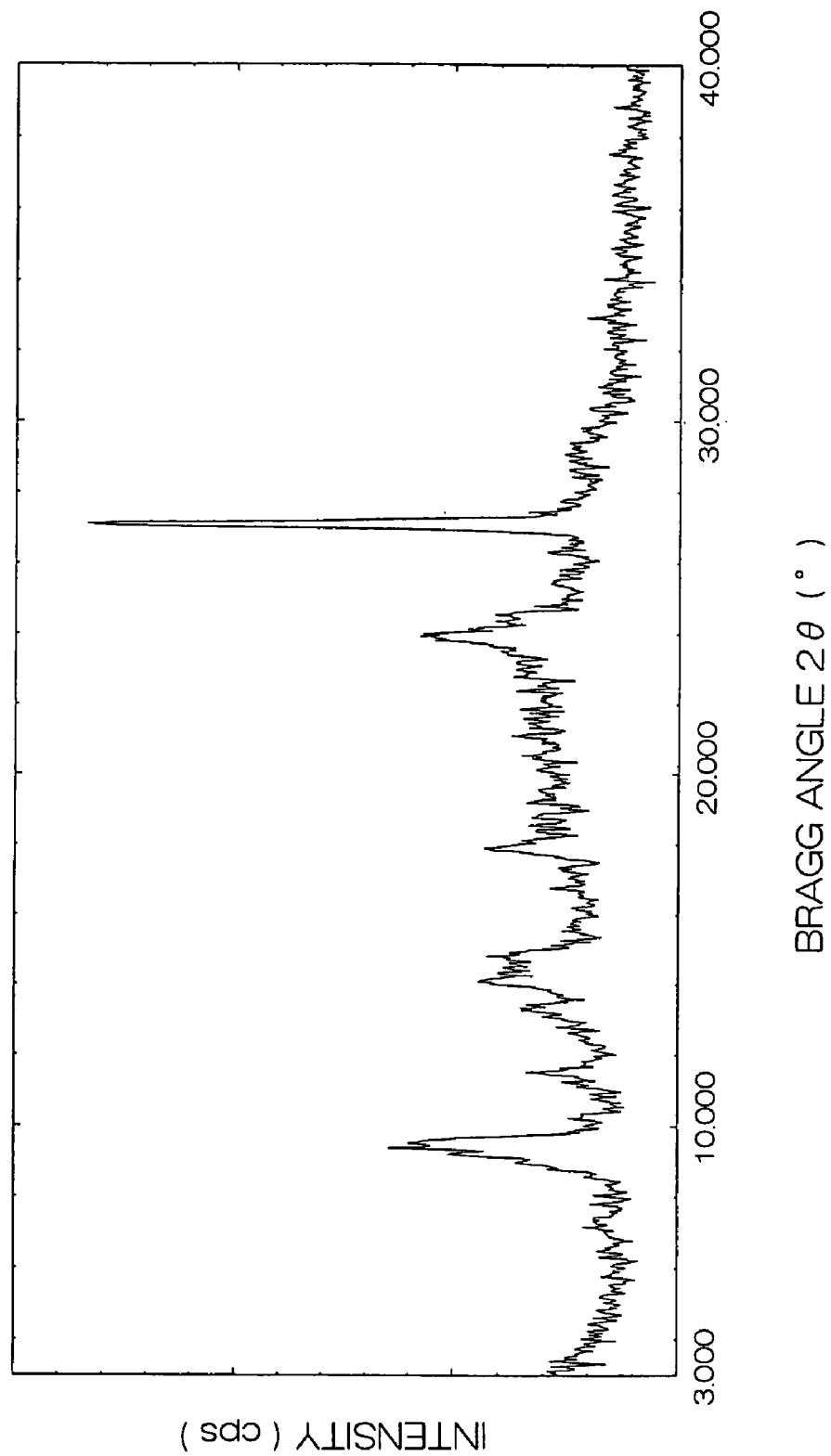
FIG. 12 is a graph showing a CuKα characteristic X-ray diffraction spectrum measured again after dipping the isolating titanyl phthalocyanine crystal of Preparation Example 1 in tetrahydrofuran for 7 days.

The measurement results are shown in FIG. 11 and FIG. 12. The respective samples correspond to the respective figures as shown below.

TABLE 11

| | Titanyl | CuKα characteristic X-ray diffraction | |
|---|---|---|---|
| | phthalocyanine Crystal | immediately after isolation | after recovery |
| Example 1 | Preparation Example 1 | FIG. 11 | FIG. 12 |

As is apparent from the result of FIG. 11 and FIG. 12, the titanylphthalocyanine crystal isolated from the single-layer type electrophotosensitive layer of Example 1 has a strong peak at a Bragg angle 2θ±0.2°=27.2°, but has no peak at 7.4° and 26.2° in any case of immediately after isolation and dipping after 7 days. As a result, it was confirmed that the titanylphthalocyanine crystal of Preparation Example 1 used in the photosensitive material of Example 1 can retain the crystal form stably even after the production of the photosensitive material.

The invention claimed is:

1. A titanyl phthalocyanine crystal formed by crystallizing a titanyl phthalocyanine compound, characterized in that the crystal has a maximum peak at a Bragg angle 2θ±0.2°=27.2°, has no peak at 7.4° in a CuKα characteristic X-ray diffraction spectrum, and the crystal does not have a peak of a change in temperature within the range from 50–400° C. except for a peak associated with evaporation of adsorbed water in differential scanning calorimetry, and the crystal recovered after dipping in an organic solvent for 7 days has a maximum peak at a Bragg angle 2θ±0.2°=27.2° and has no peak at 7.4° in a CuKα characteristic X-ray diffraction spectrum.

2. The titanyl phthalocyanine crystal according to claim 1, which has no peak at a Bragg angle 2θ±0.20=26.2° in a CuKα characteristic X-ray diffraction spectrum.

3. The titanyl phthalocyanine crystal according to claim 1, which is formed from a titanyl phthalocyanine compound represented by the formula (1):

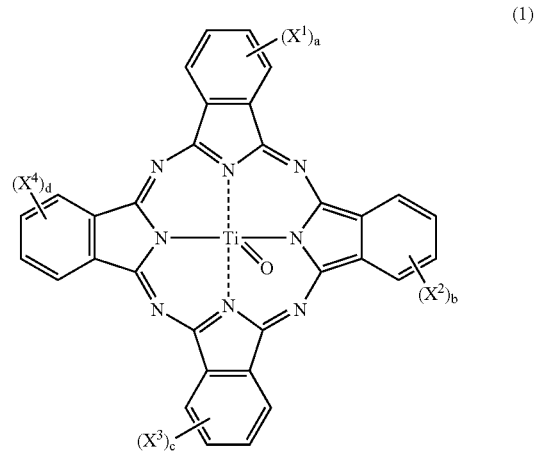

wherein $X^1$, $X^2$, $X^3$ and $X^4$ are the same or different and each represents a halogen atom, an alkyl group, an alkoxy group, a cyano group, or a nitro group, and a, b, c and d are the same or different and each represents an integer of 0 to 4.

4. The titanyl phthalocyanine crystal according to claim 1, wherein a crystal recovered after dipping does not have a peak of a change in temperature within a range from 50 to 400° C. except for a peak associated with evaporation of adsorbed water in differential scanning calorimetry.

5. The titanyl phthalocyanine crystal according to claim 1, wherein a crystal recovered after dipping has no peak at a Bragg angle 2θ±0.2°=27.2 in a CuKα characteristic X-ray diffraction spectrum.

6. The titanyl phthalocyanine crystal according to claim 1, wherein the organic solvent is at least one selected from the group consisting of tetrahydrofuran, dichloromethane, toluene and 1,4-dioxane.

7. A method of producing the titanyl phthalocyanine crystal of claim 1, which comprises the following steps:

a pigmentation pretreatment step of adding a titanyl phthalocyanine compound in an aqueous organic solvent, stirring under heating for a fixed time, and allowing the resulting solution to stand for a fixed time under the conditions at a temperature lower than that of the above stirring process, thereby to stabilize the solution;

a recrystallization step of removing the aqueous organic solvent from the solution to obtain a crude crystal of the titanyl phthalocyanine, dissolving the crude crystal of the titanyl phthalocyanine in a solvent, adding dropwise the solution in a poor solvent to recrystallize the titanyl phthalocyanine compound, and then subjecting the recrystallized compound; and a pigmentation step of dispersing the low crystalline titanyl phthalocyanine compound obtained by recrystallization in an organic solvent in the presence of water, and stirring the solution at 30 to 100° C. for 5 to 60 hours.

8. A method of producing the titanyl phthalocyanine crystal of claim 1, which comprises the following steps:
- a pigmentation pretreatment step of adding a titanyl phthalocyanine compound in an aqueous organic solvent, stirring under heating for a fixed time, and allowing the resulting solution to stand for a fixed time under the conditions at a temperature lower than that of the above stirring process, thereby to stabilize the solution;
- a step of removing the aqueous organic solvent from the solution to obtain a crude crystal of the titanyl phthalocyanine, and treating the crude crystal of the titanyl phthalocyanine according to acid-paste method; and
- a pigmentation step of dispersing the treated low crystalline titanyl phthalocyanine compound in an organic solvent in the presence of water, and stirring the solution at 30 to 100° C. for 5 to 60 hours.

9. An electrophotosensitive material comprising a conductive substrate and a photosensitive layer formed on the substrate, the photosensitive layer containing the titanyl phthalocyanine crystal of claim 1 as an electric charge generating material.

10. The electrophotosensitive material according to claim 9, wherein the photosensitive layer is a single-layer type photosensitive layer containing the titanyl phthalocyanine crystal, at least one of a hole transferring material and an electron transferring material, and a binding resin in the same layer.

11. The electrophotosensitive material according to claim 9, wherein the photosensitive layer is a multi-layer type photosensitive layer comprising at least two layers among an electric charge generating layer containing the titanyl phthalocyanine crystal, an electric charge transferring layer containing at least one of a hole transferring material and an electron transferring material, and a photoconductive layer containing the titanyl phthalocyanine crystal and at least one of a hole transferring material and an electron transferring material, which are mutually laminated.

12. A method according to claim 7, wherein in the pigmentation step, the solution is stirred at a temperature of from 50° C. to 100° C. for 5 to 60 hours.

13. A method according to claim 8, wherein in the pigmentation step, the solution is stirred at a temperature of from 50° C. to 100° C. for 5 to 60 hours.

* * * * *